(12) United States Patent
Hirotani et al.

(10) Patent No.: US 9,952,814 B2
(45) Date of Patent: *Apr. 24, 2018

(54) INFORMATION PROCESSING APPARATUS, INFORMATION PROCESSING METHOD, AND RECORDING MEDIUM

(71) Applicants: Takuya Hirotani, Kanagawa (JP); Tomoe Kitaguchi, Kanagawa (JP)

(72) Inventors: Takuya Hirotani, Kanagawa (JP); Tomoe Kitaguchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/374,084

(22) Filed: Dec. 9, 2016

(65) Prior Publication Data

US 2017/0168759 A1    Jun. 15, 2017

(30) Foreign Application Priority Data

Dec. 11, 2015    (JP) .................................. 2015-241782
Dec. 22, 2015    (JP) .................................. 2015-249867
May 10, 2016    (JP) .................................. 2016-094324

(51) Int. Cl.
*G06F 3/12* (2006.01)
*H04N 1/00* (2006.01)

(52) U.S. Cl.
CPC ............ *G06F 3/126* (2013.01); *G06F 3/1292* (2013.01); *H04N 1/00339* (2013.01); *H04N 1/00408* (2013.01)

(58) Field of Classification Search
CPC ..... H04B 5/0031; G01S 5/021; G01S 5/0247; G01S 5/0257; G01S 5/14; G06F 3/0346; G06F 3/126; G06F 3/1292; H01Q 1/243; H01Q 21/28; H01Q 5/371; H01Q 5/378; H01Q 7/00; H01Q 9/42; H04L 67/10
USPC ....... 342/451, 458; 343/702; 455/41.1, 41.2, 455/41.3, 566

See application file for complete search history.

(56) References Cited

U.S. PATENT DOCUMENTS

| 9,760,739 B2 * | 9/2017 | Ninomiya | ................ G06F 21/84 |
| 2005/0086171 A1 * | 4/2005 | Abe | ........................ G06Q 20/40 705/51 |
| 2007/0204348 A1 * | 8/2007 | Matsuda | .................. G06F 21/35 726/26 |

(Continued)

FOREIGN PATENT DOCUMENTS

| JP | 2011-048483 | 3/2011 |
| JP | 2015-103834 | 6/2015 |
| JP | 2015-184917 | 10/2015 |

OTHER PUBLICATIONS

U.S. Appl. No. 15/361,285, filed Nov. 25, 2016, Keizoh Shigaki, et al.

*Primary Examiner* — Negussie Worku
(74) *Attorney, Agent, or Firm* — Harness, Dickey & Pierce, P.L.C.

(57) ABSTRACT

An information processing apparatus includes a non-contact antenna that communicates with a communication counterpart via a non-contact communication and circuitry that generates a location guide image indicating a location of the non-contact antenna in the information processing apparatus and the location guide image including an ellipse placed at a portion of a display screen corresponding to the location of the non-contact antenna.

18 Claims, 32 Drawing Sheets

(56) References Cited

U.S. PATENT DOCUMENTS

| | | | |
|---|---|---|---|
| 2009/0050686 A1* | 2/2009 | Kon | G06Q 20/327 |
| | | | 235/375 |
| 2011/0181239 A1* | 7/2011 | Kadoyama | H02J 7/025 |
| | | | 320/108 |
| 2013/0342731 A1* | 12/2013 | Lee | H04N 5/23293 |
| | | | 348/231.4 |
| 2014/0087654 A1* | 3/2014 | Kiveisha | H04B 5/0031 |
| | | | 455/41.1 |
| 2014/0292590 A1* | 10/2014 | Yoo | H01Q 1/243 |
| | | | 343/702 |
| 2014/0368455 A1* | 12/2014 | Croisonnier | G06F 3/0414 |
| | | | 345/173 |
| 2016/0337416 A1* | 11/2016 | Galbraith | G06F 3/0421 |
| 2017/0104372 A1* | 4/2017 | Kadoyama | H02J 50/12 |
| 2017/0139585 A1* | 5/2017 | Lee | G06F 1/1613 |
| 2017/0156024 A1* | 6/2017 | Shigaki | H04W 4/008 |

* cited by examiner

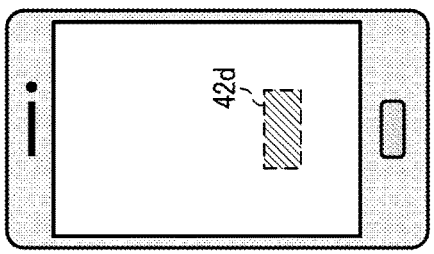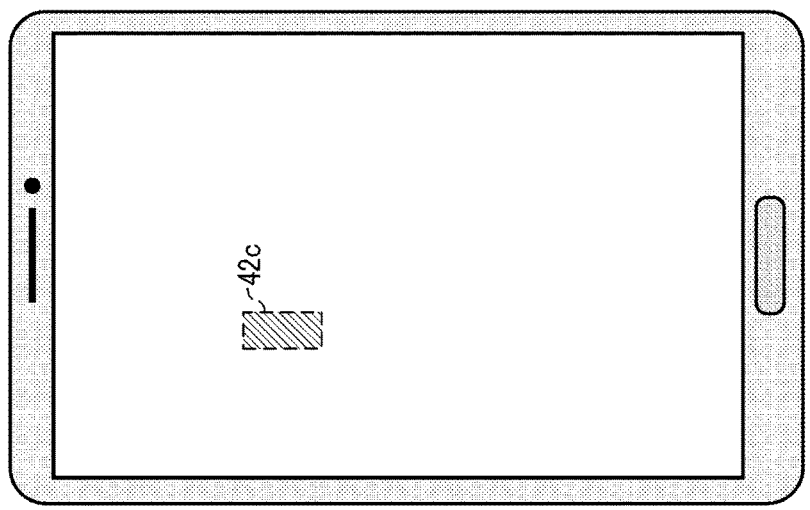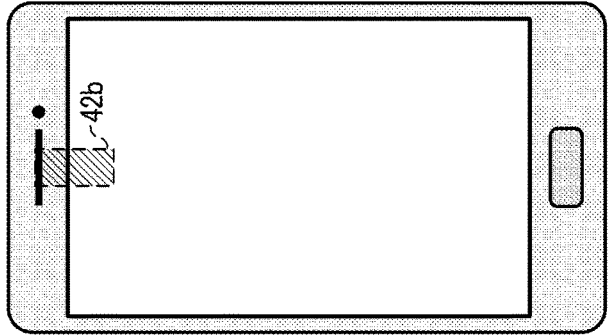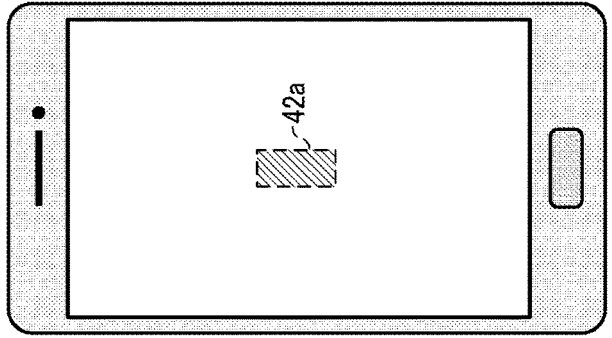

MODEL C
(MODEL NAME : CCC)

FIG. 9

ANTENNA LOCATION MANAGEMENT TABLE 200

| | MODEL NAME | NUMBER OF HORIZONTAL PARTITIONS | NUMBER OF VERTICAL PARTITIONS | HORIZONTAL LOCATION | VERTICAL LOCATION |
|---|---|---|---|---|---|
| 1 | AAA | 4 | 4 | 3 | 3 |
| 2 | BBB | 4 | 4 | 1 | 3 |
| 3 | CCC | 6 | 6 | 3 | 3 |
| 4 | DDD | 2 | 4 | 4 | 2 |
| : | : | : | : | : | : |
| | 201 | 202 | 203 | 204 | 205 |

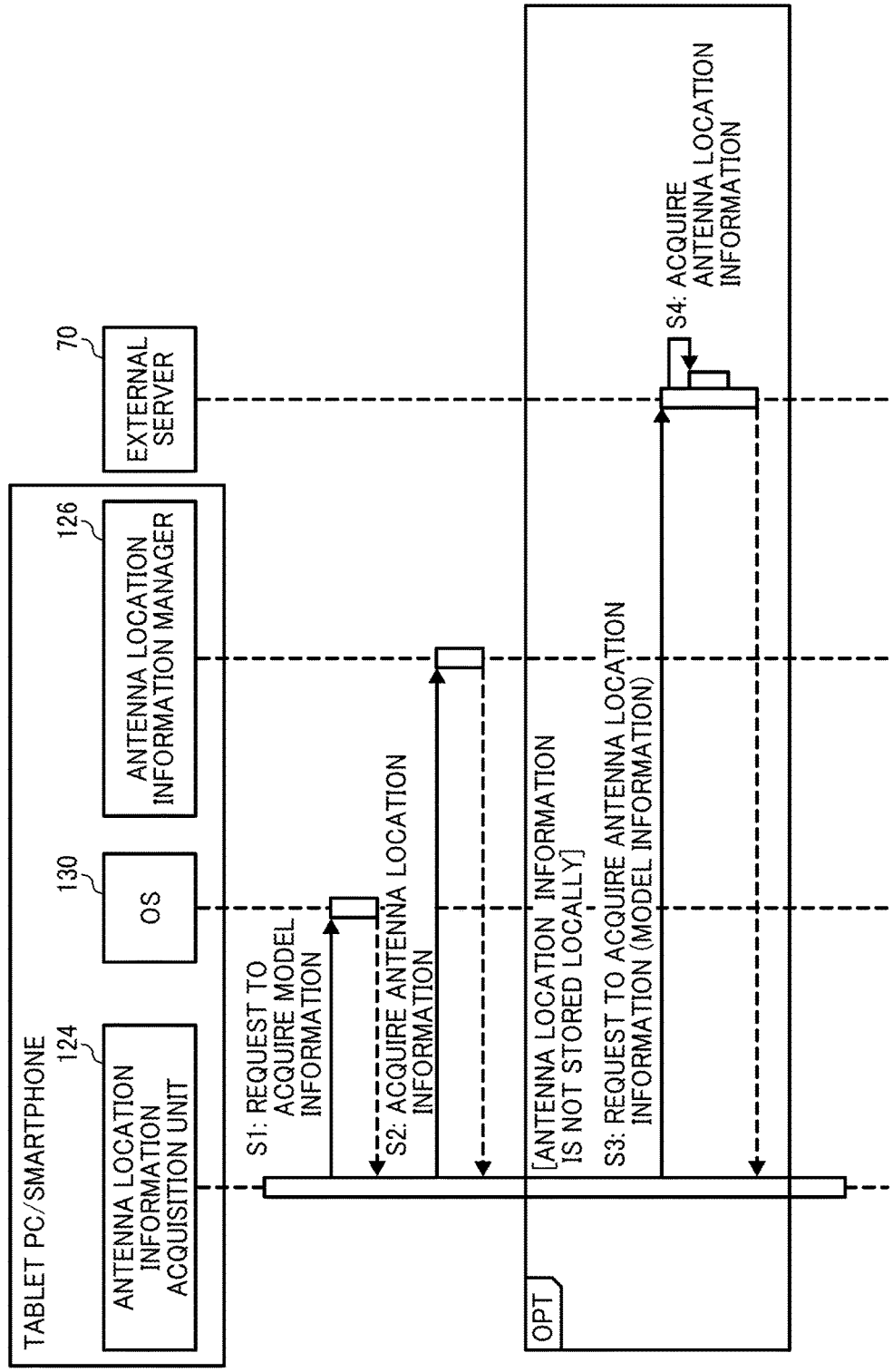

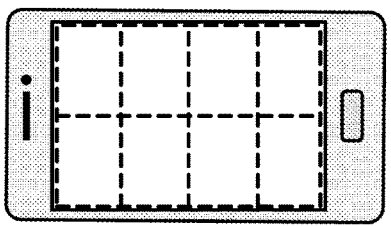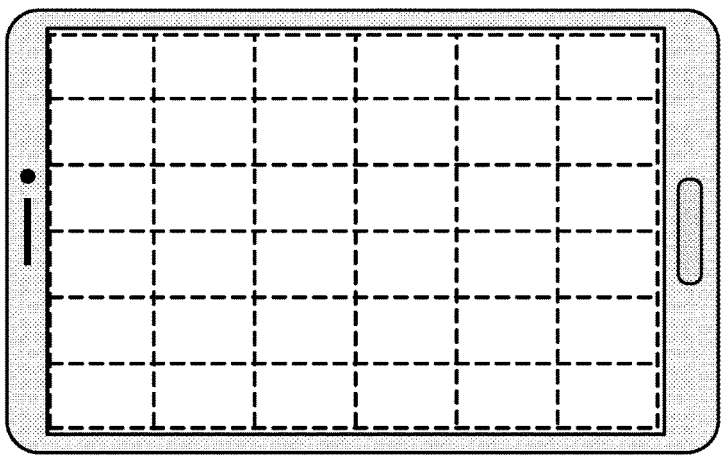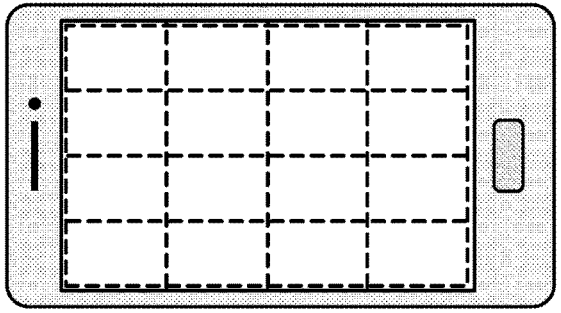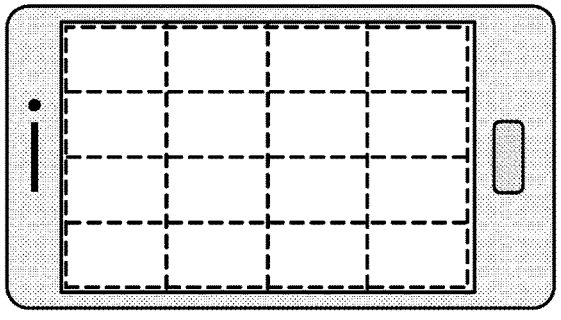

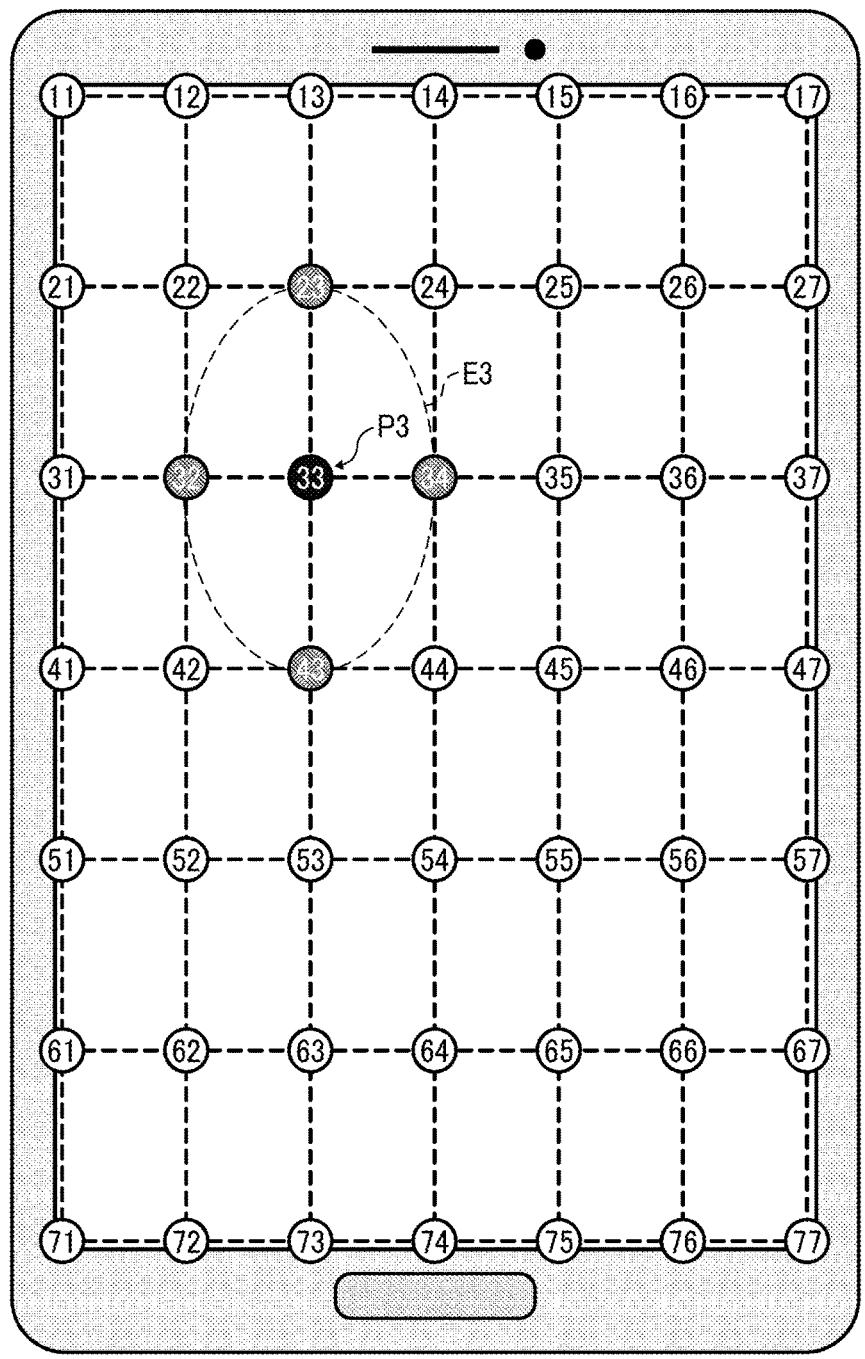

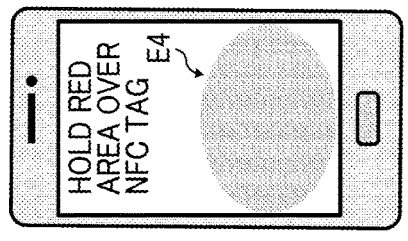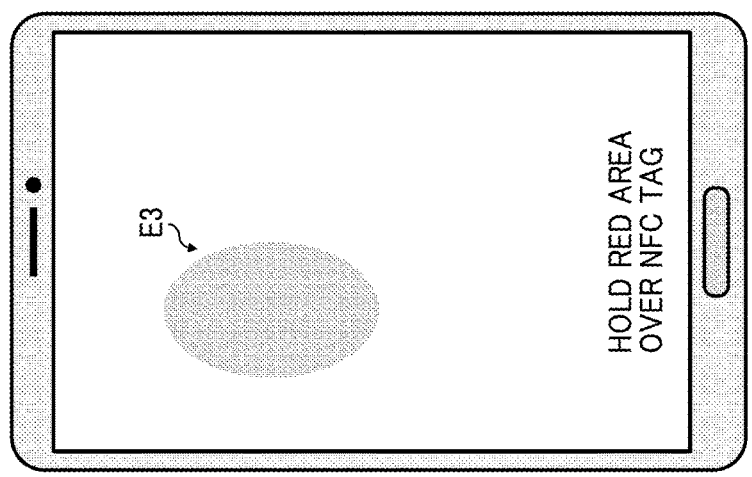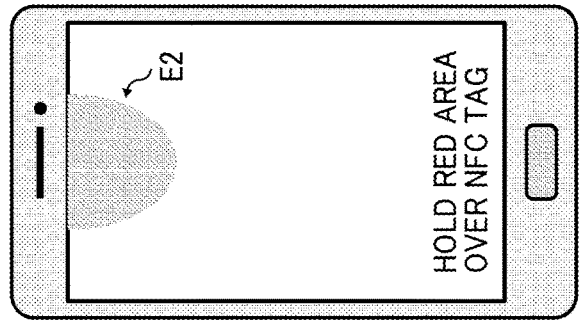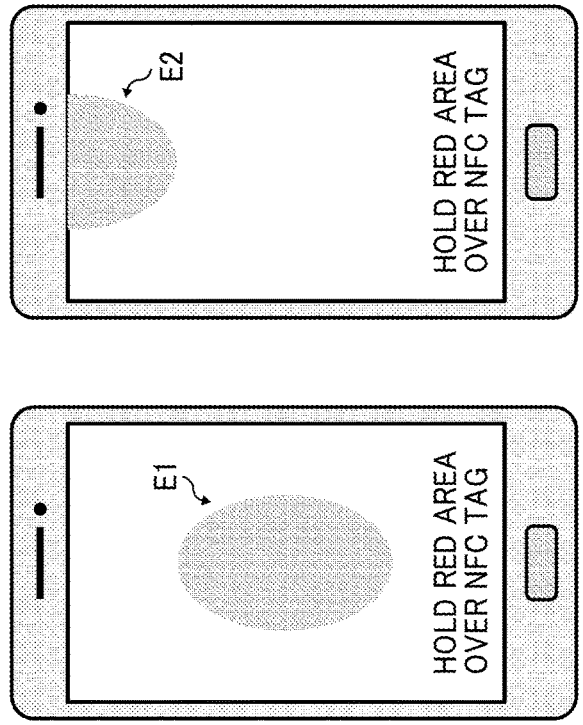
FIG. 13A MODEL A (MODEL NAME : AAA)
FIG. 13B MODEL B (MODEL NAME : BBB)
FIG. 13C MODEL C (MODEL NAME : CCC)
FIG. 13D MODEL D (MODEL NAME : DDD)

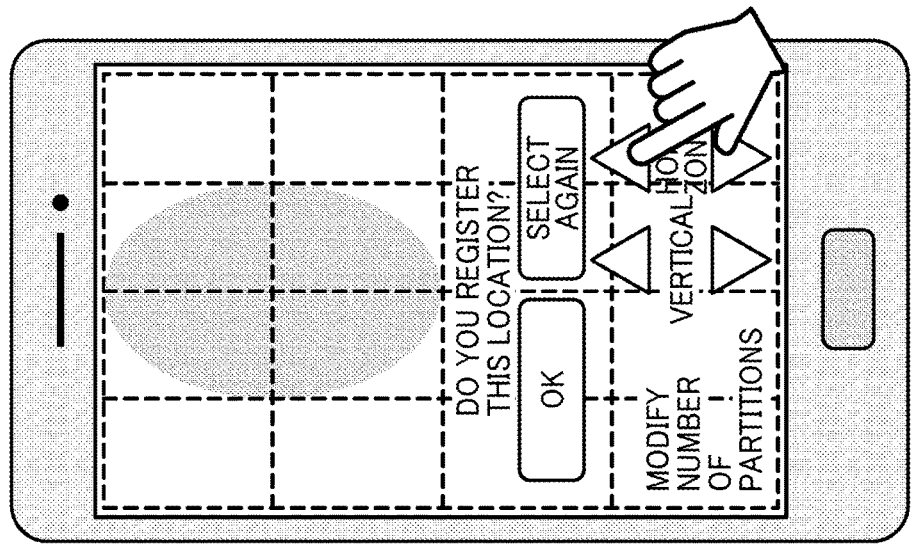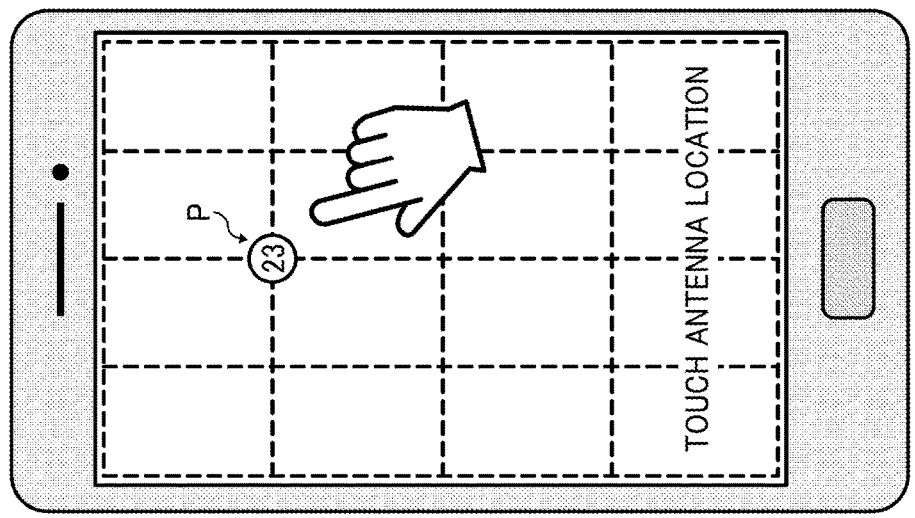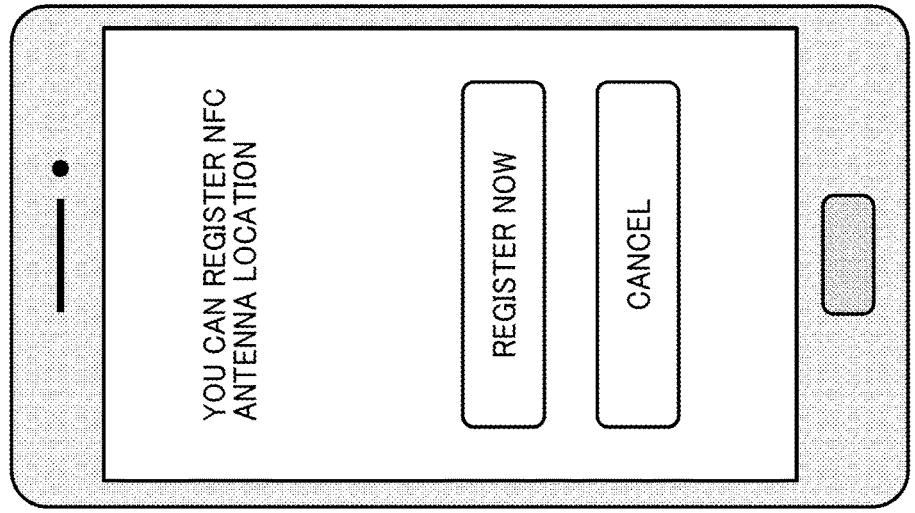

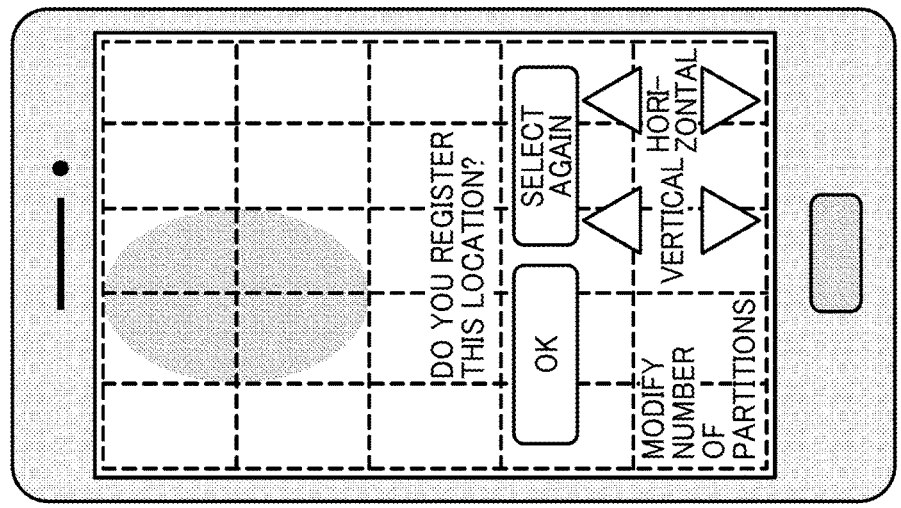
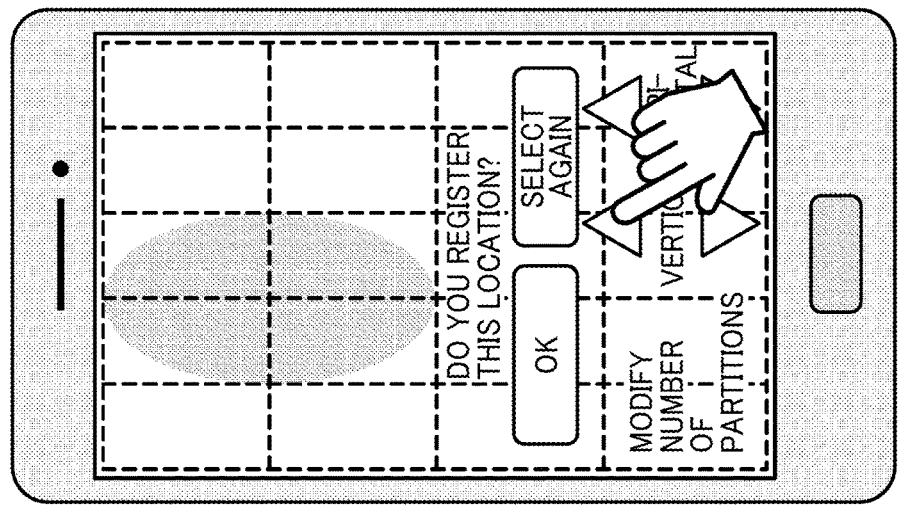

FIG. 17

ANTENNA LOCATION MANAGEMENT TABLE 300

| | MODEL NAME | SCREEN RESOLUTION | NFC LOCATION COORDINATES | ELLIPSE RADIUS (DX) | ELLIPSE RADIUS (DY) |
|---|---|---|---|---|---|
| 1 | AAA | 320 × 240 | (100, 200) | 50 | 70 |
| 2 | BBB | 480 × 640 | (240, 320) | 100 | 100 |
| 3 | CCC | 1024 × 1280 | (512, 320) | 128 | 256 |
| 4 | DDD | 1080 × 1920 | (240, 320) | 240 | 320 |
| : | : | : | : | : | : |
| | 301 | 302 | 303 | 304 | 305 |

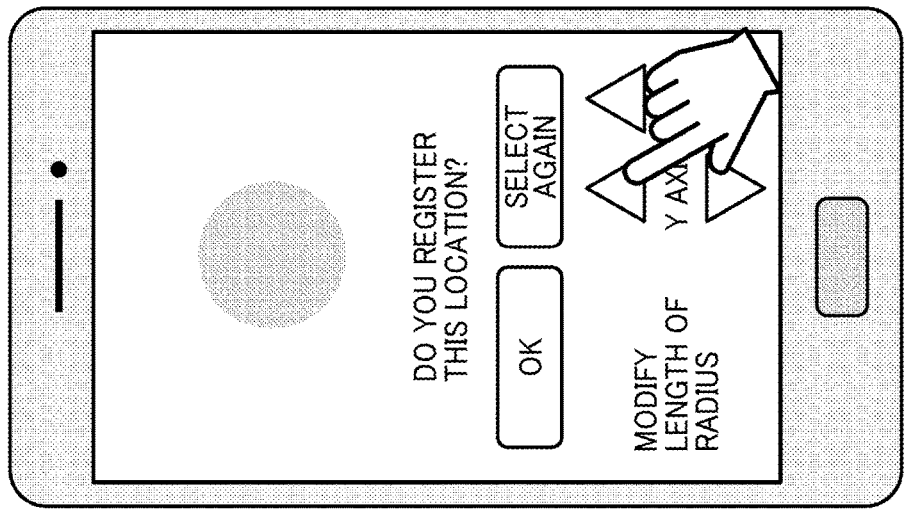
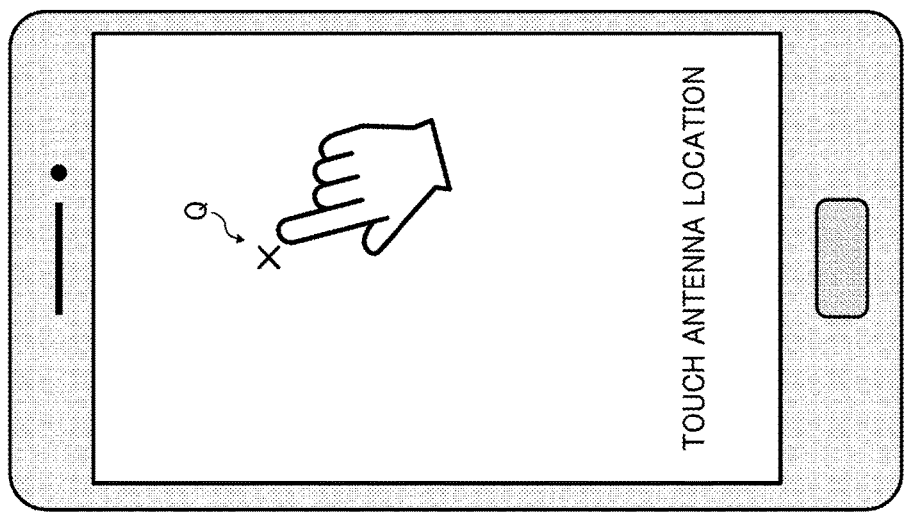
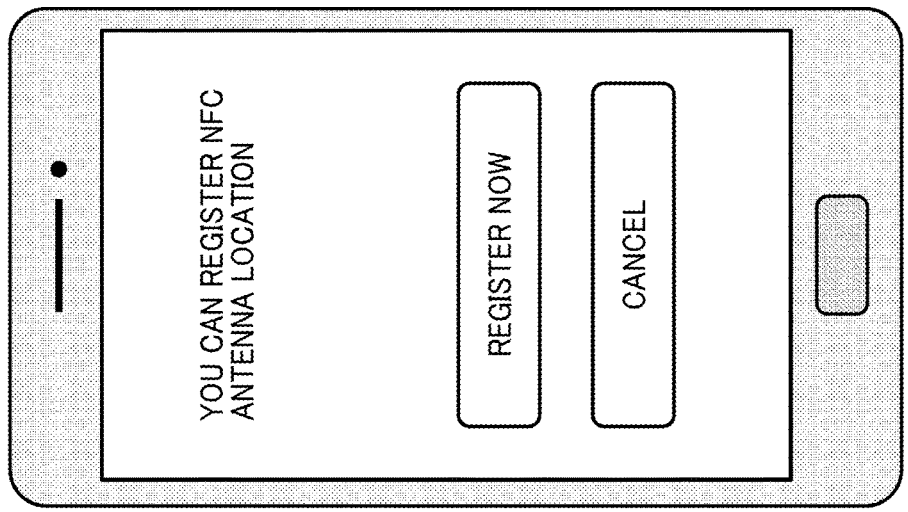

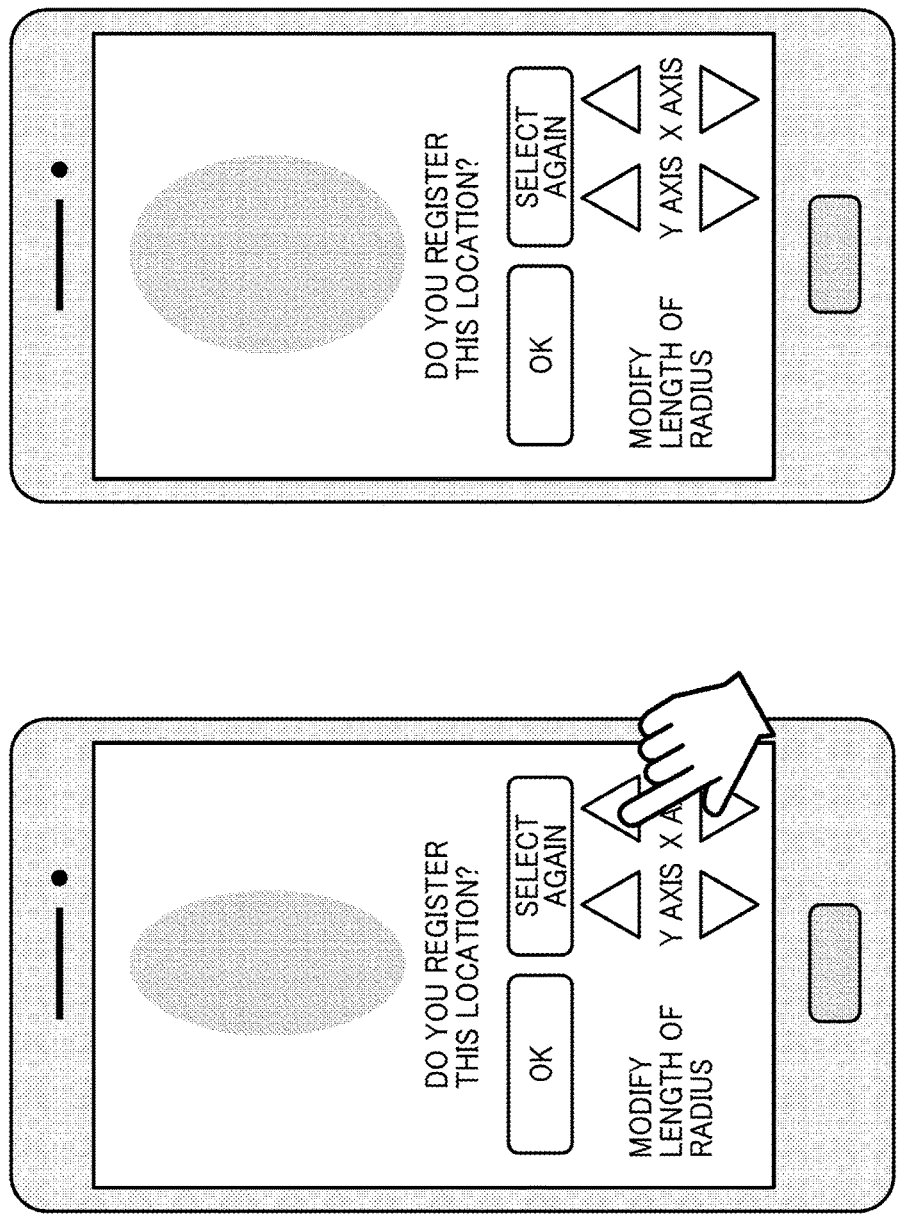

ANTENNA LOCATION GUIDANCE IMAGE MANAGEMENT TABLE

|   | MODEL NAME | ANTENNA LOCATION GUIDANCE IMAGE |
|---|---|---|
| 1 | AAA | aaa.jpg |
| 2 | BBB | bbb.jpg |
| 3 | CCC | ccc.jpg |
| 4 | DDD | ddd.jpg |
| .. | ... | ... |

401  402

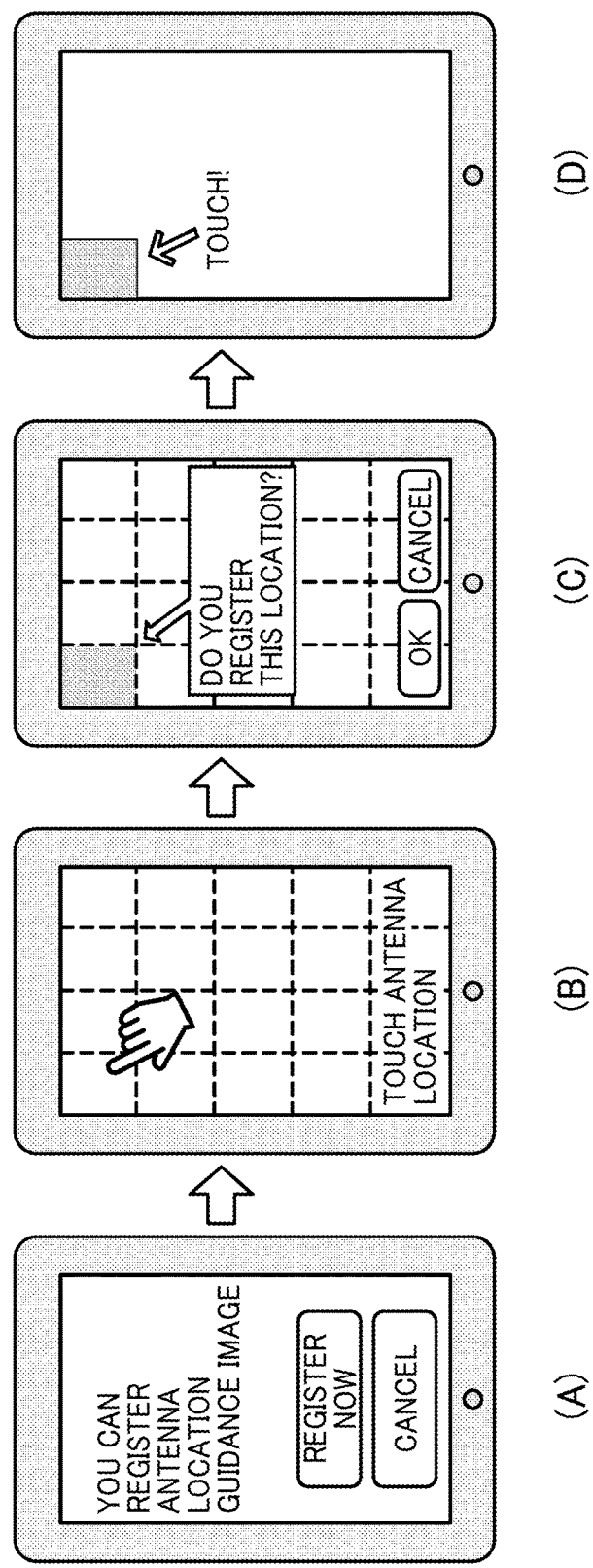

INFORMATION PROCESSING APPARATUS, INFORMATION PROCESSING METHOD, AND RECORDING MEDIUM

CROSS-REFERENCE TO RELATED APPLICATION

This patent application is based on and claims priority pursuant to 35 U.S.C. § 119(a) to Japanese Patent Applications No. 2015-241782, filed on Dec. 11, 2015, No. 2015-249867, filed on Dec. 22, 2015, and No. 2016-094324, filed on May 10, 2016 in the Japan Patent Office, the entire disclosure of which is hereby incorporated by reference herein.

BACKGROUND

Technical Field

The present invention relates to an information processing system, an information processing method, and a non-transitory recording medium storing an information processing program.

Background Art

The recent smart devices such as smartphones and tablet personal computers (PCs) are provided with a Near Field Communication (NFC) function, which is one example of a non-contact communication function. In addition, seal-type programmable NFC tags (non-contact IC tags) are widely used, which may be freely attached to any place such as on various devices. Using smart devices and NFC tags that operate in cooperation, various operations are automated.

In one example of automating operations by cooperation between smart devices and NFC tags, information to be used for connection to a wireless network such as Wi-Fi (registered trademark) or Bluetooth (registered trademark) is written in the NFC tags, and the smart device is automatically connected to the wireless network once a user holds the smart device over the NFC tag.

In the NFC standards, it is required to place one NFC antenna close to another NFC antenna so that the distance between these NFC antennas becomes at least several centimeters to establish connection. However, generally, users are not aware where the NFC antenna is located on the smart device. Therefore, sometimes it takes time to find a location of the NFC antenna, thus, taking time to establish the non-contact communication.

SUMMARY

Example embodiments of the present invention provide a novel information processing apparatus that includes a non-contact antenna that communicates with a communication counterpart via a non-contact communication and circuitry that generates a location guide image indicating a location of the non-contact antenna in the information processing apparatus and the location guide image including an ellipse placed at a portion of a display screen corresponding to the location of the non-contact antenna.

Further example embodiments of the present invention provide a method of processing information and a non-transitory recording medium storing an information processing program.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIGS. 7A, 7B, 7C, and 7D are diagrams illustrating information on defining antenna location as an embodiment of the present invention;

FIG. 9 is a diagram illustrating a antenna location management table as an embodiment of the present invention;

FIG. 10 is a sequence chart illustrating an operation of acquiring information on defining antenna location as an embodiment of the present invention;

FIGS. 11A, 11B, 11C, and 11D are diagrams illustrating an operation generating a screen for introducing antenna location as an embodiment of the present invention;

FIGS. 12A, 12B, 12C, and 12D are diagrams illustrating an operation generating the screen for introducing antenna location as an embodiment of the present invention;

FIGS. 13A, 13B, 13C, and 13D are diagrams illustrating the screen for introducing antenna location as an embodiment of the present invention;

FIGS. 15A, 15B, 15C, 15D and 15E are diagrams illustrating a screen of registering an antenna location as an embodiment of the present invention;

FIG. 17 is a diagram illustrating a antenna location management table as an embodiment of the present invention;

FIGS. 18A, 18B, 18C, 18D, and 18E are diagrams illustrating a screen of registering an antenna location as an embodiment of the present invention;

FIG. 21 is a diagram illustrating a table of managing an image for introducing antenna location as an embodiment of the present invention;

FIG. 24 is a diagram illustrating a screen of registering an image of introducing an antenna location as an embodiment of the present invention.

Figure 1:
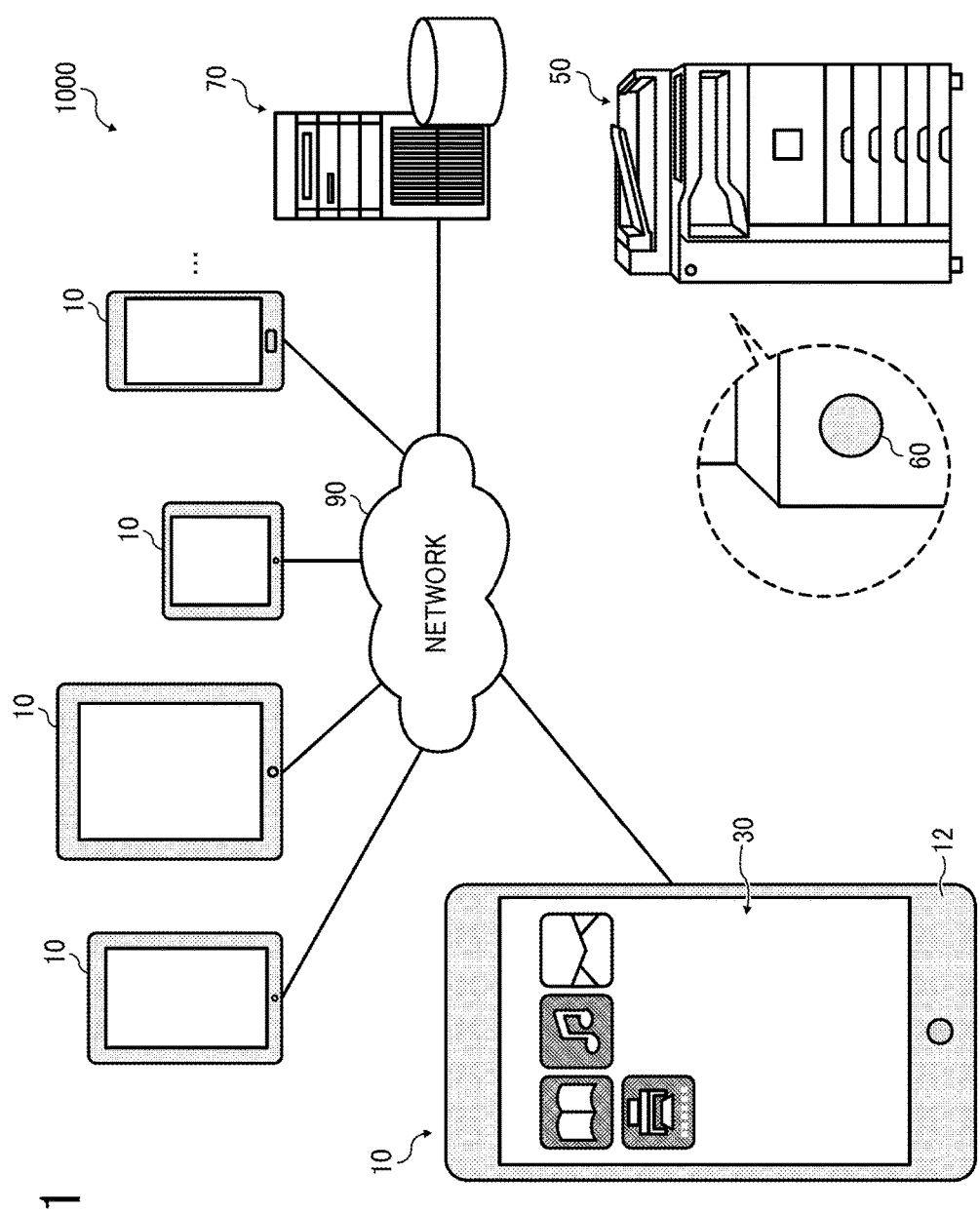
FIG. 1 is a diagram illustrating a network system as an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

A more complete appreciation of the disclosure and many of the attendant advantages thereof will be readily obtained as the same becomes better understood by reference to the following detailed description when considered in conjunction with the accompanying drawings.

Embodiments of the present invention are described below in detail with reference to figures. In figures, same symbols are assigned to same or corresponding parts, and their descriptions are simplified or omitted appropriately.

First Embodiment

FIG. 1 is a diagram illustrating an external view of an information processing apparatus 10 in this embodiment. The information processing apparatus 10 in this embodiment is a portable information processing apparatus provided with a NFC function as a non-contact communication function (i.e., near-field wireless communication). The information processing apparatus 10 further includes a display 30 on a front surface of a case 12 of the information processing apparatus 10.

In FIG. 1, a smartphone is illustrated as an example of the information processing apparatus 10 in this embodiment. However, the information processing apparatus 10 is not limited to the smartphone and may be a tablet PC etc. That is, any apparatus including the non-contact communication function and the display may be used as the information processing apparatus 10.

Next, a hardware configuration of the smartphone 10 and a server apparatus 70, which together constructs a network system 1000 in this embodiment, is described below with reference to FIGS. 2A and 2B.

Figure 2A:
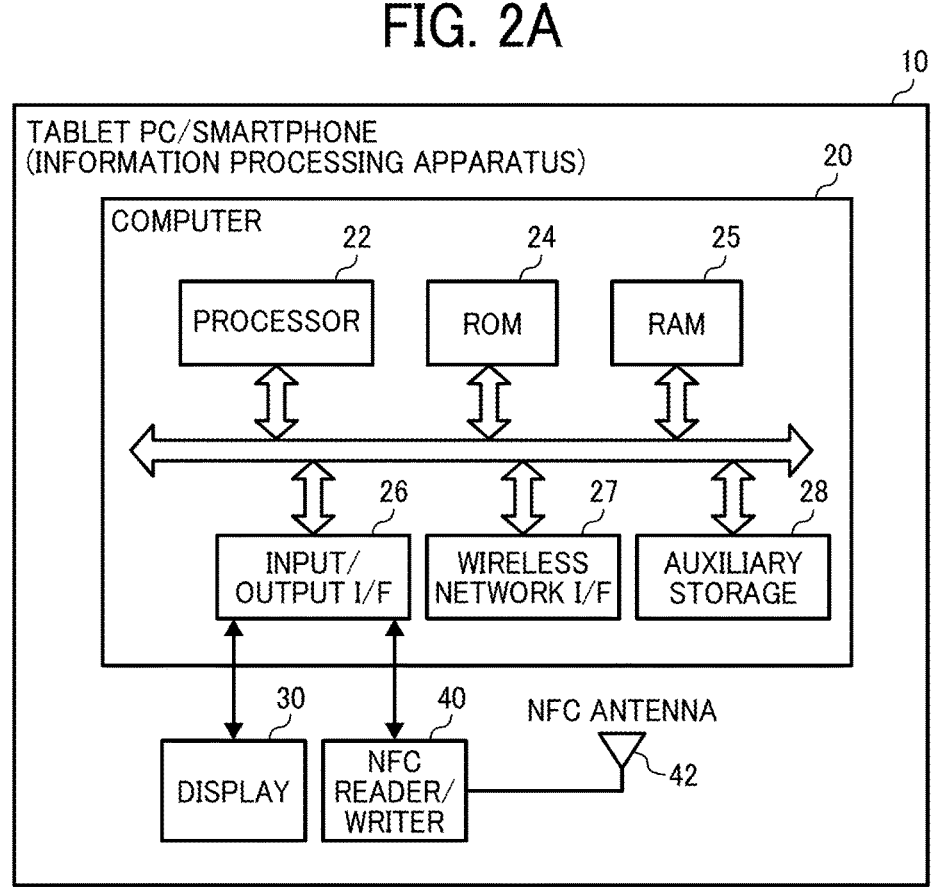
FIGS. 2A and 2B are diagrams illustrating a hardware configuration of the network system as an embodiment of the present invention.

As illustrated in FIG. 2A, a computer 20 that controls the smartphone 10 at least includes a processor 22, a read only memory (ROM) 24 that stores a boot program and a firmware program etc., a random access memory (RAM) 25 that provides an area for executing the program, an input/output interface (I/F) 26 connected to a display 30 etc., a wireless network I/F 27 connected to a network 90 including near-field wireless networks such as Wi-Fi and Bluetooth etc. and mobile networks such as 3G and LTE etc., and an auxiliary storage 28 that stores an operating system (OS) and an application program (described later) etc.

Furthermore, the smartphone 10 includes a NFC reader/writer 40 that allows the computer 20 to communicate with a communication counterpart via the input/output I/F 26, and a NFC antenna 42 connected to the NFC reader/writer 40. The NFC antenna 42 is a non-contact communication antenna for exchanging a high-frequency signal with a counterpart NFC module, and is located at a predetermined area within the case 12 of the smartphone 10.

Figure 2B:
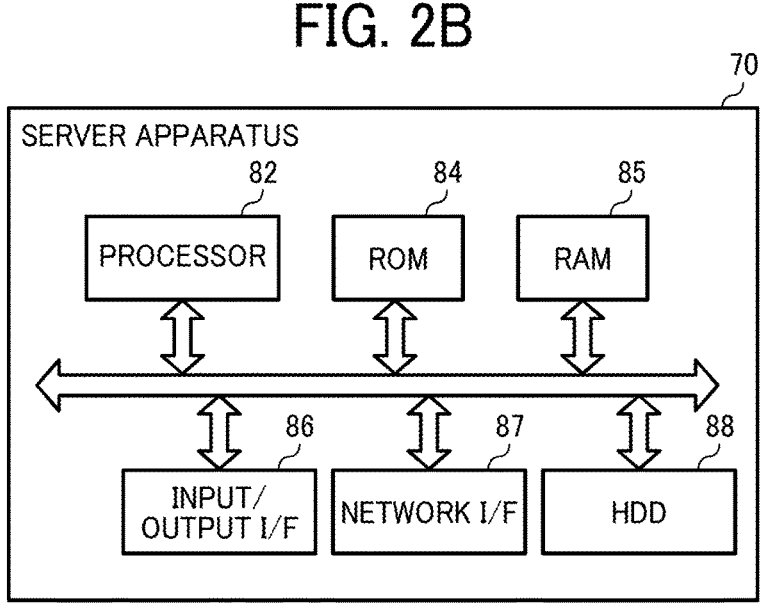

As illustrated in FIG. 2B, the server apparatus 70 includes a processor 82 that controls the entire apparatus, a ROM 84 that stores a boot program and a firmware program etc., a RAM 85 that provides an area for executing the program, an input/output I/F 86, a network I/F 87 that connects to the network 90, and a hard disk drive (HDD) 88 that stores various programs such as an OS and an database application program etc. and various data including an image of guiding an antenna location (described later).

Next, a functional configuration of each apparatus that constructs the network system 1000 is described below with reference a diagram illustrating functional blocks in FIG. 3.

Here, an application program installed in the computer 20 in the smartphone 10 is described below.

In the smartphone 10 in this embodiment, an application program for outputting a print job to a printer via a wireless network (hereinafter referred to as a print application) is installed. Here, the print application installed in the smartphone 10 may acquire destination information of the printer to which the print job is transferred via a non-contact IC tag compatible with the NFC standard (hereinafter referred to as a NFC tag). For example, as illustrated in FIG. 1, if a NFC tag 60 storing the destination information of a printer 50 is attached to a case of the printer 50, as the smartphone 10 is held over the NFC tag 60 by user operation, the print job is automatically transferred from the smart phone 10 to the printer 50.

A functional configuration, implemented by execution of the print application on the computer 20 in the smartphone 10 is described below with reference to a diagram illustrating functional blocks in FIG. 3.

Figure 3:
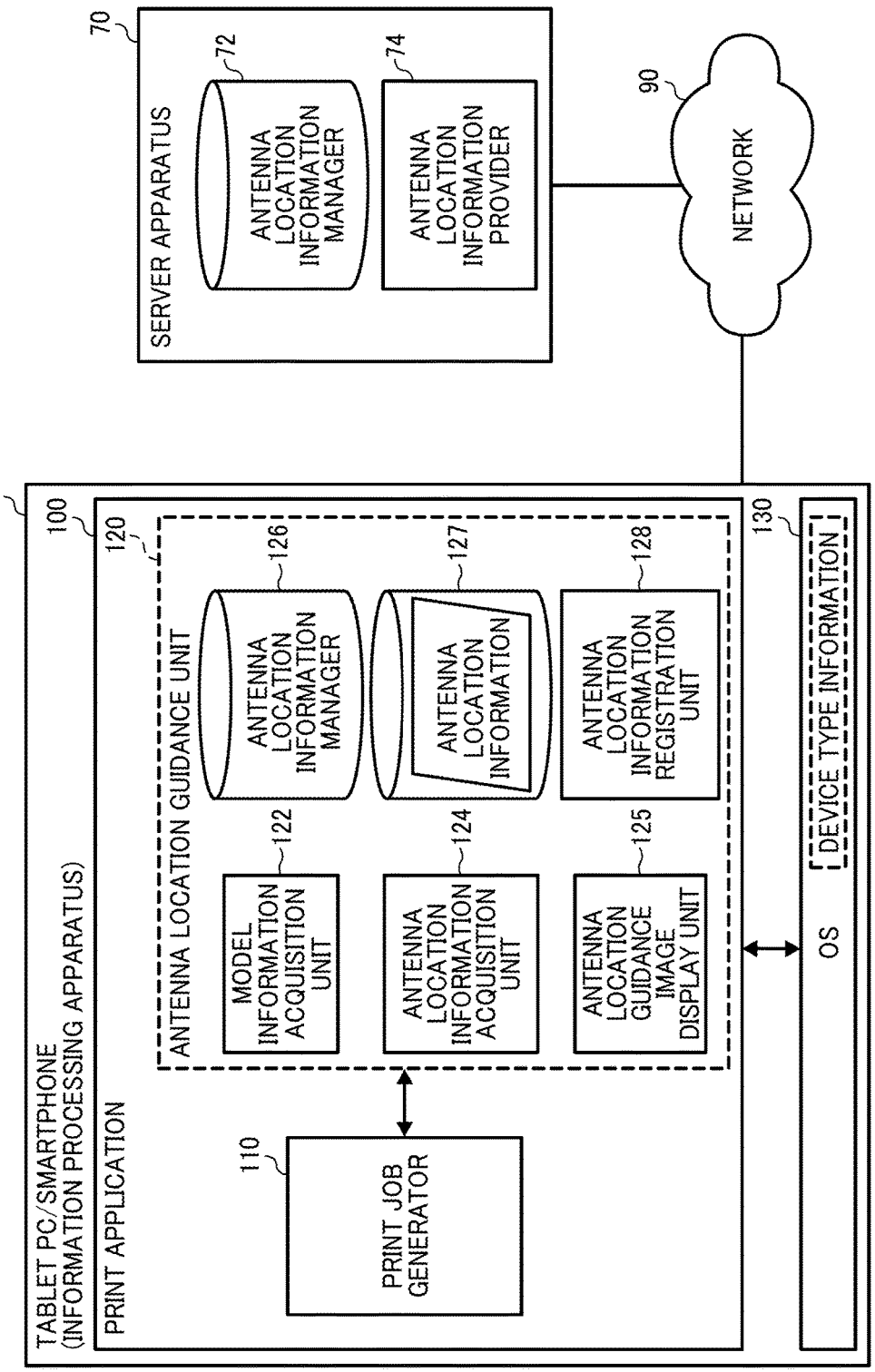
FIG. 3 is a diagram illustrating functional blocks of the network system as an embodiment of the present invention.

As illustrated in FIG. 3, a print job generator 110 and an antenna location guidance unit 120 are implemented by the print application 100 installed in the smartphone 10 in this embodiment.

The print job generator 110 accepts a user selection of a file to be printed, generates a print job regarding the file selected by the user, and transfers the generated print job to a destination specified by user operation.

On the other hand, the antenna location guidance unit 120 is a module called by the print job generator 110 in providing an image that assists the user to easily making connection to the NFC tag. The antenna location guidance unit 120 includes a model information acquisition unit 122, an antenna location information acquisition unit 124, an location guidance image display unit 125, an antenna location information manager 126, and an antenna location information registration unit 128.

The model information acquisition unit 122 acquires model information indicating its own model from an OS 130 installed in the smartphone 10.

The antenna location information acquisition unit 124 acquires information indicating a location of the NFC antenna corresponding to its own model (hereinafter referred to as antenna location information) from the antenna location information manager 126 or an external server apparatus (hereinafter referred to as an external server) 70. The antenna location information acquisition unit 124 stores the acquired antenna location information in a predetermined memory managed by the antenna location guidance unit 120. It should be noted that the antenna location information is described later in detail. In some cases, the location of the NFC antenna is simply referred to as "antenna location" in the below description.

The antenna location information manager 126 manages model information of mobile information processing apparatuses each provided with the NFC function (e.g., smartphones and tablet PCs etc.) and the corresponding antenna location information associated with each other.

The location guidance image display unit 125 displays an image for guiding a location of its own NFC antenna to the user (hereinafter referred to as a location guidance image) on the display 30.

The antenna location information registration unit 128 accepts registering the antenna location information by user operation if its own model information or the antenna location information corresponding to its own model information could not be acquired.

On the other hand, the server apparatus 70 in this embodiment includes an antenna location information manager 72 and an antenna location information provider 74.

The antenna location information manager 72 manages model information of mobile information processing apparatuses each provided with the NFC function (e.g., tablet PCs and smartphones etc.) and the corresponding antenna location information associated with each other.

The antenna location information provider 74 provides antenna location information managed by the antenna location information manager 72 in response to a request from the mobile information processing apparatus provided with the NFC function (e.g., tablet PCs and smartphones etc.).

Next, an operation performed by the smartphone 10 is described below with reference to the flowchart illustrated in FIG. 4.

Figure 5:
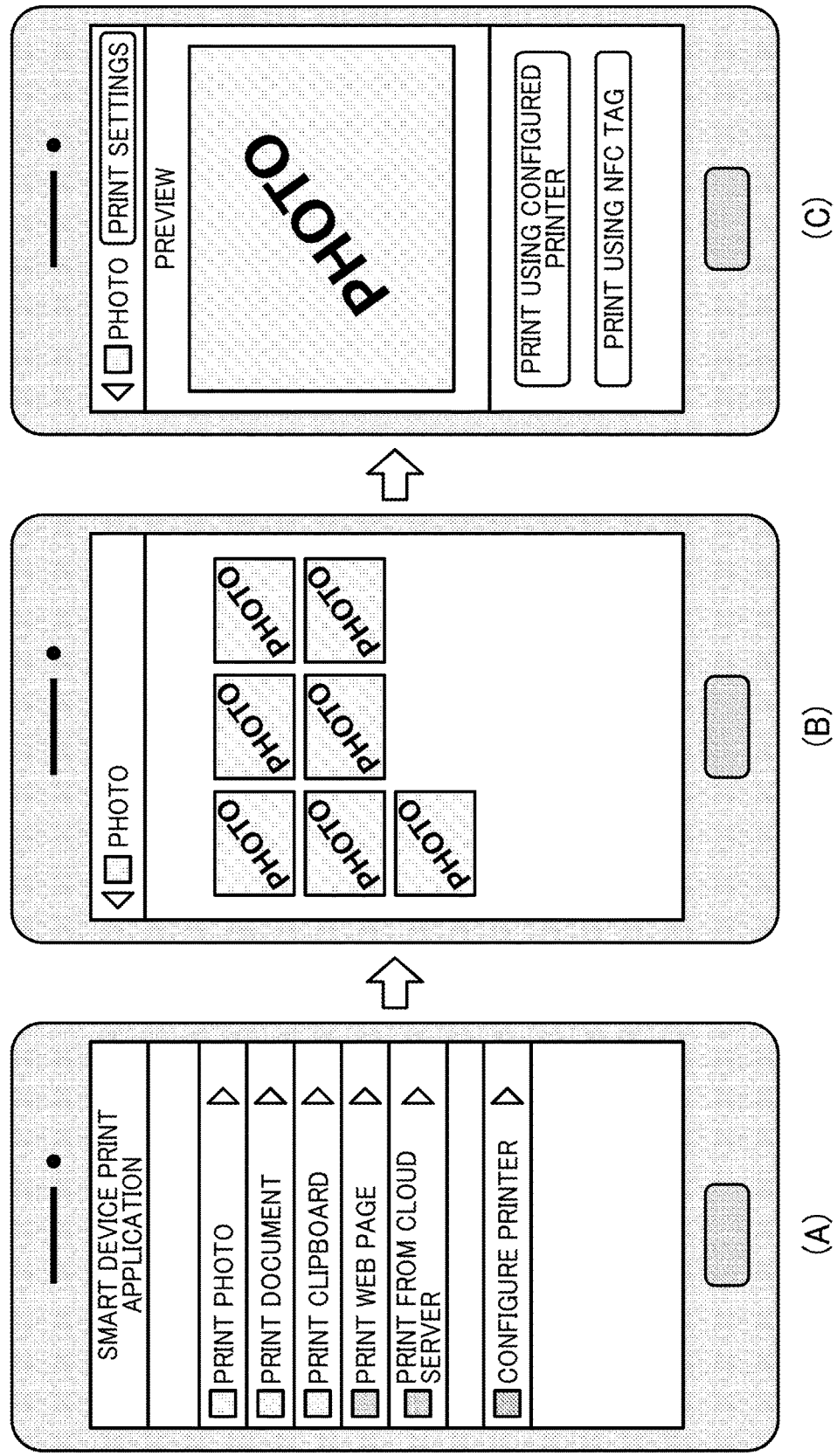
FIG. 5 is a diagram illustrating a service screen of a print application as an embodiment of the present invention.

As the print application is started by user operation, the print job generator 110 performs steps S101 to S104. First, in S101, a menu screen of the print application illustrated in FIG. 5A is displayed on the display 30. For example, after "print photo" among lists displayed in the menu screen is selected by user operation, a screen for selecting a photo illustrated in FIG. 5B is displayed. After a thumbnail of a photo to be printed is selected by user operation, in S102, a screen for accepting a print job is displayed.

An example of the screen for accepting a print job displayed in S102 is illustrated in FIG. 5C. As illustrated in FIG. 5C, in the screen for accepting a print job, "print settings" button for configuring conditions of the print job is displayed along with a preview of the photo selected by user operation. Furthermore, in the screen for accepting a print job, two buttons, "print using configured printer" and "print using NFC tag", for accepting a command to execute the print job by user operation are displayed. The configured printer in this example is preliminarily configured by the user.

After displaying the screen for accepting a print job, the print job generator 110 waits for a command to execute the job by user operation in S103. After the screen for accepting a print job is displayed, if either one of the two buttons described above is selected by user operation (YES in S103), it is determined whether or not "print using NFC tag" is selected in S104 subsequently. As a result, if "print using NFC tag" is not selected (i.e., "print using configured printer" is selected) (NO in S104), the operation proceeds to S112. In S112, an IP address as destination information of the configured printer is read from a predetermined memory managed by the print application, and the print job is transferred to the IP address to end the operation.

By contrast, if "print using NFC tag" is selected (YES in S104), the antenna location guidance unit 120 is called by the print job generator 110, and steps S105 to S108 are performed.

First, in S105, the location guidance image display unit 125 determines whether or not its own antenna location information is stored in the memory 127. If it is determined that its own antenna location information is not stored in the memory 127 (NO in S105), the operation proceeds to S106, and the antenna location information acquisition unit 124 acquires antenna location information.

Here, the operation of acquiring antenna location information performed by the antenna location information acquisition unit 124 is described below with reference to the flowchart illustrated in FIG. 6.

First, in S201, its own model information is requested to the OS 130 in the smartphone 10 and acquired. If its own model information is acquired from the OS 130 (YES in S202), subsequently, in S203, antenna location information corresponding to the model information is acquired from an antenna location management table 200 (described later) managed by the antenna location information manager 126.

Here, antenna location information is described below.

In this embodiment, the display area of the mobile information processing apparatus including the NFC antenna is divided into a predetermined number of partitions using virtually defined grids. A combination of the following information (1) to (4) defined with the grids is referred to as "antenna location information". (1) the number of grid partitions in the horizontal direction (hereinafter referred to as horizontal number of partitions) (2) the number of grid partitions in the vertical direction (hereinafter referred to as vertical number of partitions) (3) horizontal line location information indicating a location of a horizontal line of grids that goes through a grid point P corresponding to a location of the NFC antenna (hereinafter referred to as horizontal line location) (4) vertical line location information indicating a location of a vertical line of grids that goes through a grid point P corresponding to a location of the NFC antenna (hereinafter referred to as vertical line location)

Figure 8A:
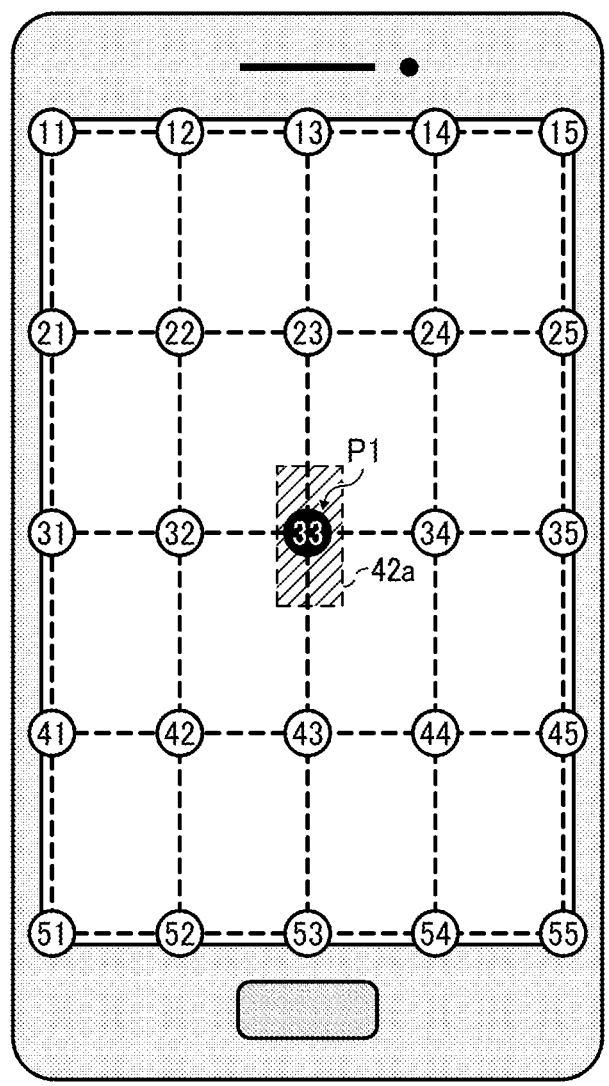
FIGS. 8A, 8B, 8C, and 8D are diagrams illustrating information on defining antenna location as an embodiment of the present invention.

For example, in case of "model A" illustrated in FIG. 7A, as illustrated in FIG. 8A, the display area of the model A is divided into grids with the horizontal number of partitions "4" and the vertical number of partitions "4". A grid point P1 located just above the NFC antenna 42a is regarded as a point corresponding to the location of the NFC antenna 42a. The third horizontal line from the top and the third vertical line from the left intersect at the grid point P1. Therefore, in this case, a combination of four information, "four" as the horizontal number of partitions, "four" as the vertical number of partitions, "three" as the horizontal line location, and "three" as the vertical line location is determined as the antenna location information for "the model A".

Figure 8B:
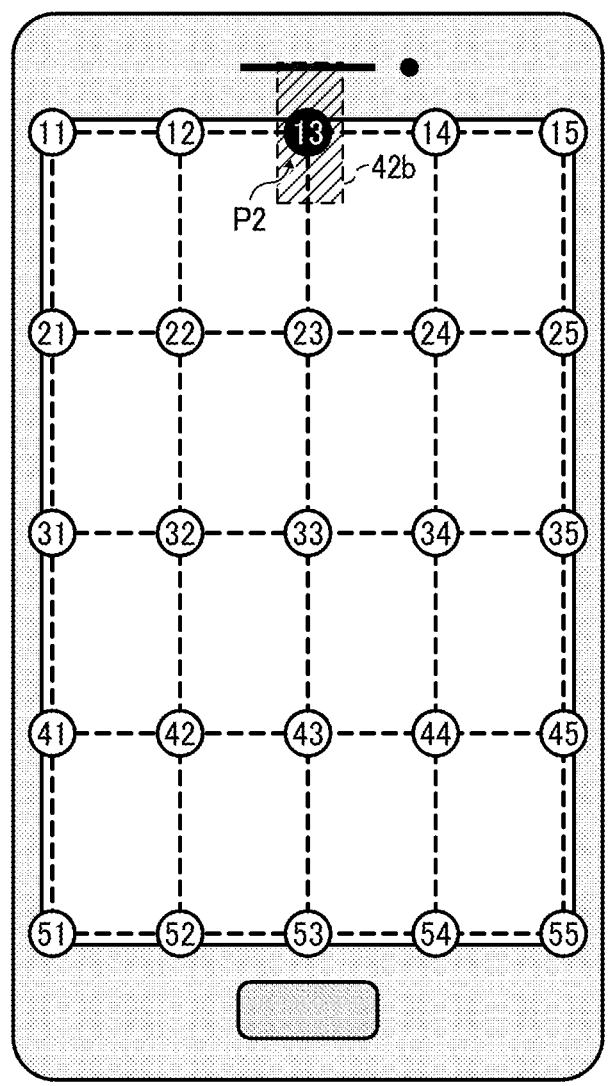

Similarly, in case of "model B" illustrated in FIG. 7B, as illustrated in FIG. 8B, the display area of the model B is divided into grids with the horizontal number of partitions "4" and the vertical number of partitions "4". A grid point P2 located just above the NFC antenna 42*b* is regarded as a point corresponding to the location of the NFC antenna 42*b*. The first horizontal line from the top and the third vertical line from the left intersect at the grid point P2. Therefore, in this case, a combination of four information, "four" as the horizontal number of partitions, "four" as the vertical number of partitions, "one" as the horizontal line location, and "three" as the vertical line location is determined as the antenna location information for "the model B".

Figure 8C:
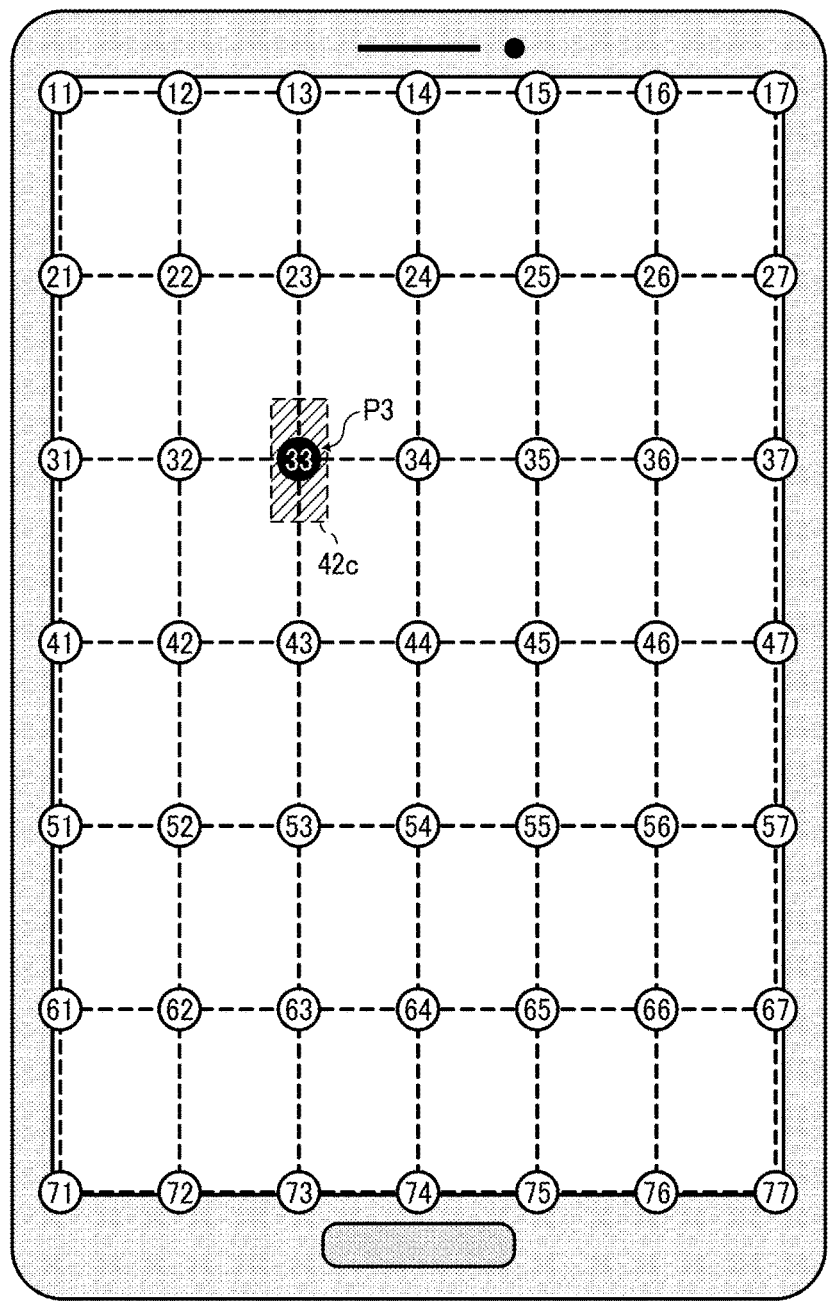

Similarly, in case of "model C" illustrated in FIG. 7C, as illustrated in FIG. 8C, the display area of the model C is divided into grids with the horizontal number of partitions "6" and the vertical number of partitions "6". A grid point P3 located just above the NFC antenna 42*c* is regarded as a point corresponding to the location of the NFC antenna 42*c*. The third horizontal line from the top and the third vertical line from the left intersect at the grid point P3. Therefore, in this case, a combination of four information, "six" as the horizontal number of partitions, "six" as the vertical number of partitions, "three" as the horizontal line location, and "three" as the vertical line location is determined as the antenna location information for "the model C".

Figure 8D:
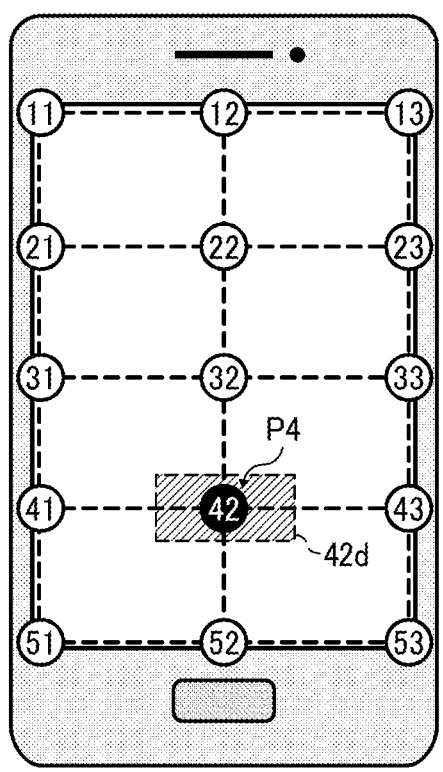

Similarly, in case of "model D" that a NFC antenna is located at a location illustrated in FIG. 7D, as illustrated in FIG. 8D, the display area of the model D is divided into grids with the horizontal number of partitions "2" and the vertical number of partitions "4", a grid point P4 located just above the NFC antenna 42*d* is regarded as a point corresponding to the location of the NFC antenna 42*d*. The fourth horizontal line from the top and the second vertical line from the left intersect at the grid point P4. Therefore, in this case, a combination of four information, "four" as the horizontal number of partitions, "two" as the vertical number of partitions, "one" as the horizontal line location, and "three" as the vertical line location is determined as the antenna location information for "the model D".

FIG. 9 is a diagram illustrating an example of the antenna location management table 200 managed by the antenna location information manager 126 in this embodiment. As illustrated in FIG. 9, the antenna location management table 200 includes a field 201 that stores a model name as model information of an apparatus including the NFC antenna, a field 202 that stores the horizontal number of partitions, a field 203 that stores the vertical number of partitions, a field 204 that stores the horizontal line location, and a field 205 that stores the vertical line location. In this embodiment, the antenna location information manager 126 manages the model name associated with the information on antenna location (such as the horizontal number of partitions, the vertical number of partitions, the horizontal line location, and the vertical line location) on the antenna location management table 200 for each model of portable information processing apparatuses.

Here, in this embodiment, in addition that the antenna location information manager 126 manages the antenna location management table 200, an external server 70 on a network accessible by the smartphone 10 may manage the antenna location management table 200.

In this case, if the antenna location management table 200 is managed both by the antenna location information manager 126 in the smartphone 10 and the external server 70, an operation performed in S203 is described below with reference to a sequence chart illustrated in FIG. 10.

First, the antenna location information acquisition unit 124 in the smartphone 10 requests the OS 130 to acquire the model information to acquire its own model name in S1. Subsequently, the antenna location information acquisition unit 124 acquires the antenna location information associated with the model name acquired in S1 from the antenna location management table 200 managed by the antenna location information manager 126 in S2.

On the other hand, due to reasons such as data in a local storage is deleted unintentionally, if there is no corresponding model name or corresponding antenna location information in the antenna location management table 200 managed by the antenna location information manager 126, a request for acquiring antenna location information including the model name (i.e., the model information) is generated, and the request is transferred to the external server 70 via the network in S3. In response, the external server 70 searches through the antenna location management table 200 managed by the external server 70 itself using the model name included in the request for acquiring antenna location information received from the smartphone 10 as a key, acquires the corresponding antenna location information associated with the key, and transfers the acquired antenna location information to the smartphone 10 in S4.

Figure 6:
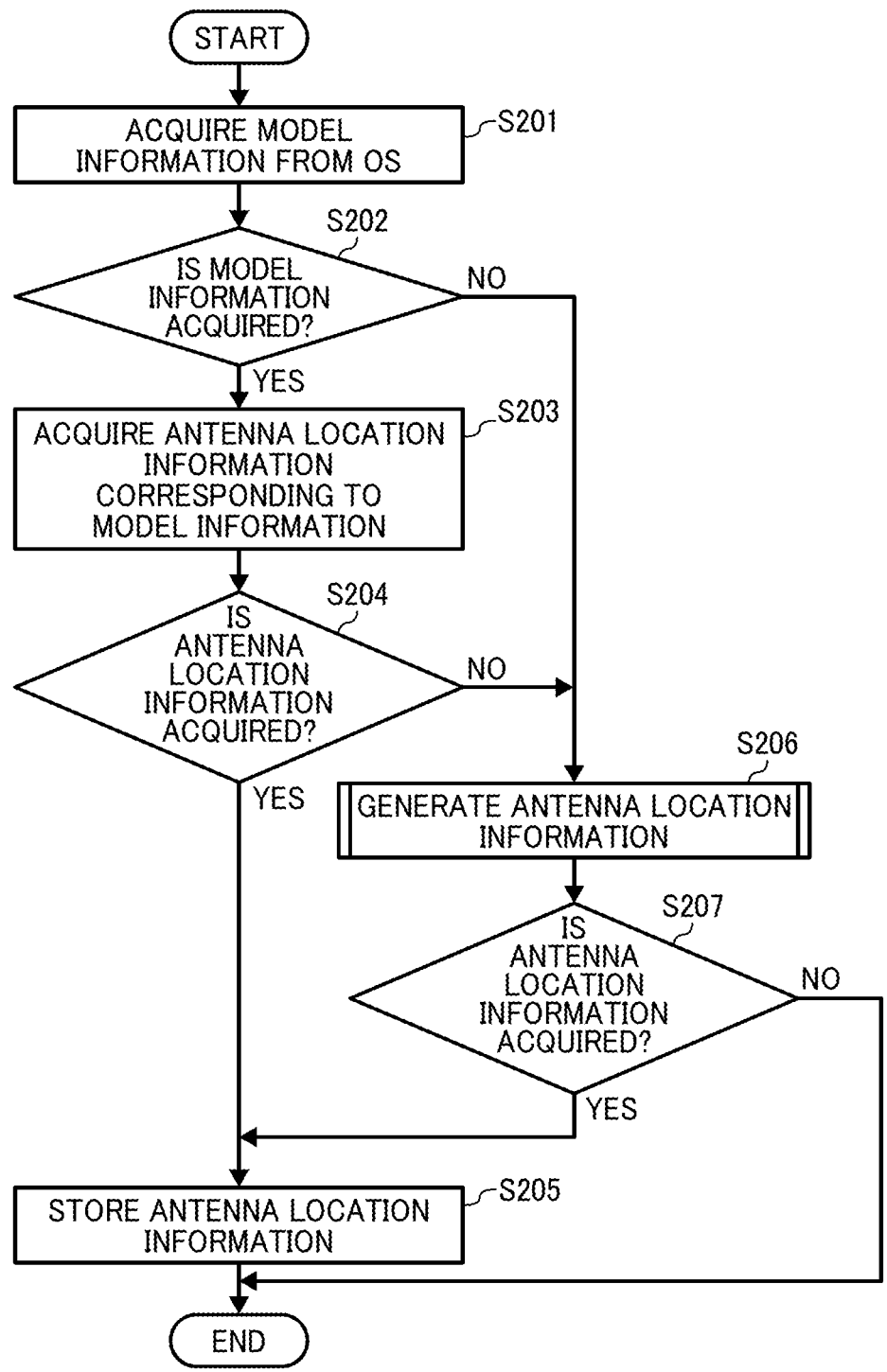
FIG. 6 is a flowchart illustrating an operation of acquiring information on defining antenna location as an embodiment of the present invention.

Now, the description continues with reference to FIG. 6.

If, in S203 as described before, the antenna location information is acquired from either the antenna location information manager 126 or the external server 70 (YES in S204), the operation proceeds to S205. After storing the acquired antenna location information in the memory 127, the operation ends.

By contrast, due to some reasons, if the model information is not acquired from the OS 130 (NO in S202) or the antenna location information is not acquired from neither the antenna location information manager 126 nor the external server 70 (NO in S204), the antenna location information acquisition unit 124 calls the antenna location information registration unit 128, and the antenna location information registration unit 128 generates the antenna location information in S206. It should be noted that the operation of generating the antenna location information is described later in detail.

After generating the antenna location information in S206, if the antenna location information is acquired (YES in S207), the operation proceeds to S205. After the antenna location information registration unit 128 stores the acquired antenna location information in the memory 127, the operation ends.

The operation of acquiring antenna location information is described above. Now, the description continues with reference to FIG. 4.

After acquiring antenna location information in S106, if the antenna location information is stored in the memory 127 (YES in S107) or it is determined that its own antenna location information is stored in the memory in S105 as described before (YES in S105), the operation proceeds to S108, and the location guidance image display unit 125 generates an image for guiding location based on the acquired antenna location information.

Here, "the image for guiding location" indicates an image that guides the user in identifying location of the NFC antenna so that the user may know the location of the NFC antenna. In this embodiment, as "the image for guiding location", an image displaying an ellipse indicating the location of the NFC antenna is generated as described below.

More specifically, first, based on the horizontal number of partitions and the vertical number of partitions included in the acquired antenna location information, grids dividing the display area of its own display screen into grids are vertically defined.

For example, if the horizontal number of partitions "4" and the vertical number of partitions "4" are included in the antenna location information of the model A, grids dividing the display area of the model A into grids as illustrated in FIG. 11A are defined. Similarly, if the horizontal number of partitions "4" and the vertical number of partitions "4" are included in the antenna location information of the model B, grids dividing the display area of the model B into grids as illustrated in FIG. 11B are defined. If the horizontal number of partitions "6" and the vertical number of partitions "6" are included in the antenna location information of the model C, grids dividing the display area of the model C into grids as illustrated in FIG. 11C are defined. If the horizontal number of partitions "2" and the vertical number of partitions "4" are included in the antenna location information of the model D, grids dividing the display area of the model D into grids as illustrated in FIG. 11D are defined.

Next, based on the horizontal line location and the vertical line location included in the acquired antenna location information, a point corresponding to the location of its own NFC antenna is defined.

Figure 12A:
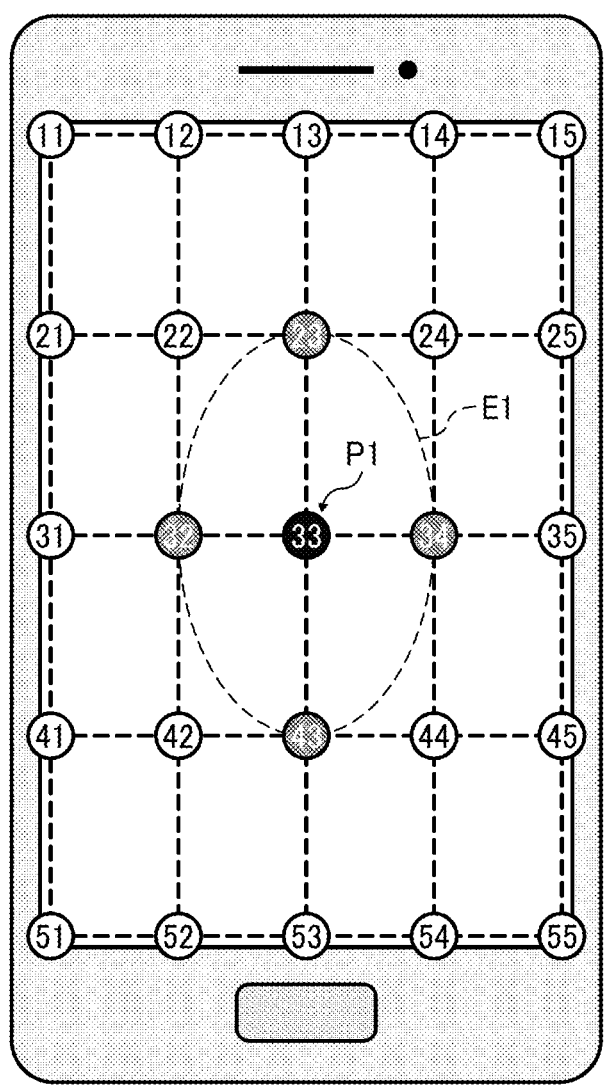
Figure 12B:
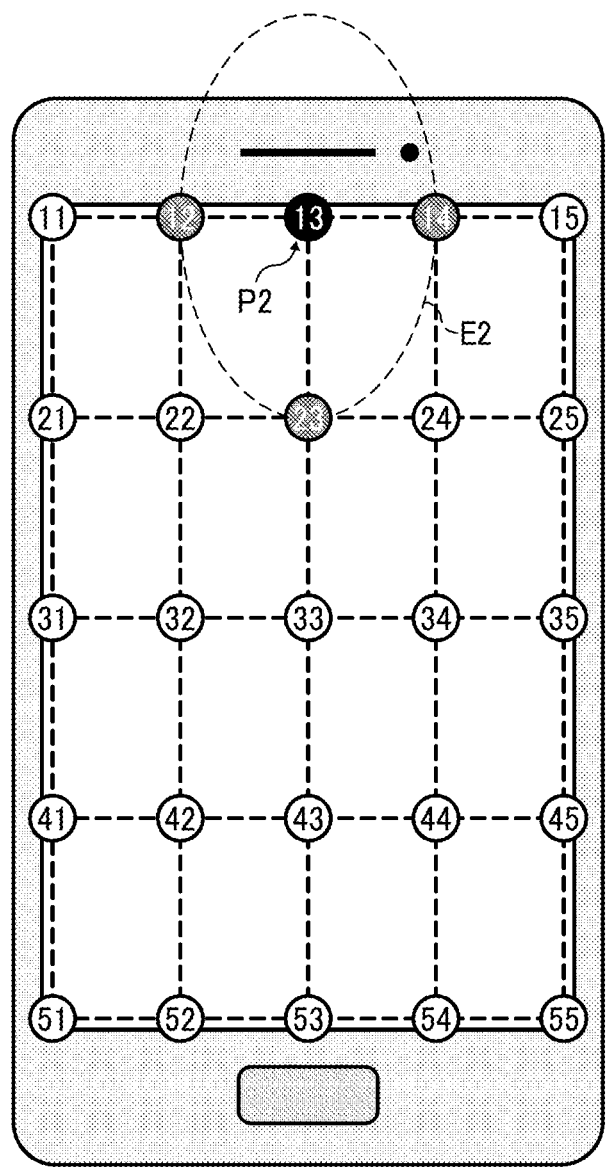
Figure 12D:
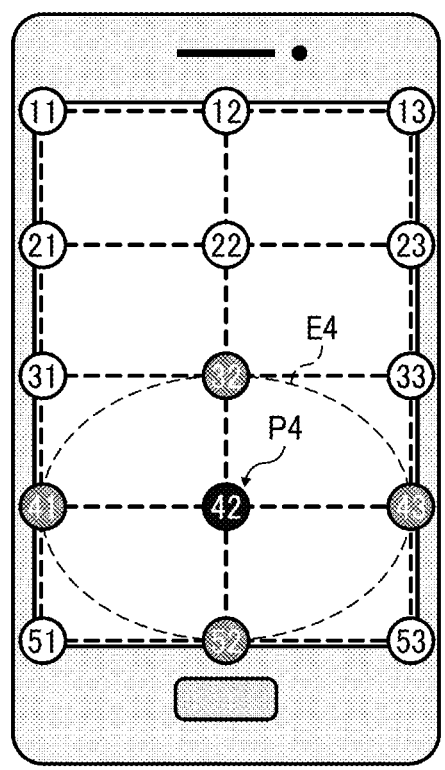

For example, if the horizontal line location "3" and the vertical line location "3" are included in the antenna location information of the model A, as illustrated in FIG. 12A, a grid point P1 where the third horizontal line from the top and the third vertical line from the left intersects is defined as the point corresponding to the antenna location of the model A. Similarly, if the horizontal line location "1" and the vertical line location "3" are included in the antenna location information of the model B, as illustrated in FIG. 12B, a grid point P2 where the first horizontal line from the top and the third vertical line from the left intersects is defined as the point corresponding to the antenna location of the model B. If the horizontal line location "3" and the vertical line location "3" are included in the antenna location information of the model C, as illustrated in FIG. 12C, a grid point P3 where the third horizontal line from the top and the third vertical line from the left intersects is defined as the point corresponding to the antenna location of the model C. If the horizontal line location "4" and the vertical line location "2" are included in the antenna location information of the model D, as illustrated in FIG. 12D, a grid point P4 where the fourth horizontal line from the top and the second vertical line from the left intersects is defined as the point corresponding to the antenna location of the model D.

Next, an ellipse whose center is located at the point (i.e., the grid point P) corresponding to the antenna location defined as described above is defined. Here, the ellipse described above includes a perfect circle.

In this embodiment, the ellipse that crosses four grid points adjacent to the point (i.e., the grid point P) corresponding to the antenna location is defined. That is, regarding the model A, as illustrated in FIG. 12A, an ellipse E1 that passes four grid points adjacent to the grid point P1 is defined. Regarding the model B, as illustrated in FIG. 12B, an ellipse E2 that passes four grid points adjacent to the grid point P2 is defined. Regarding the model C, as illustrated in FIG. 12C, an ellipse E3 that passes four grid points adjacent to the grid point P3 is defined. Regarding the model D, as illustrated in FIG. 12D, an ellipse E4 that passes four grid points adjacent to the grid point P4 is defined.

Lastly, the image displaying the ellipse defined as described above is generated as "the image for guiding location".

For example, regarding the model A described above, an image that displays the defined ellipse E1 on the display screen as illustrated in FIG. 13A is generated as the image for guiding location. Similarly, regarding the model C described above, an image that displays the defined ellipse E3 on the display screen as illustrated in FIG. 13C is generated as the image for guiding location. Regarding the model D described above, an image that displays the defined ellipse E4 on the display screen as illustrated in FIG. 13D is generated as the image for guiding location.

It should be noted that, regarding the model B described above, as illustrated in FIG. 12B, a part of the defined ellipse E2 is out of the display area. Therefore, an image that displays the defined ellipse E2 whose shape lacks the part on the display screen as illustrated in FIG. 13B is generated as the image for guiding location. As described above, if the image for guiding location including the ellipse whose shape lacks a part is displayed on the display screen, the user may intuitively recognize that the NFC antenna is located astride outside the display area of the display.

In FIGS. 13A to 13D, the defined ellipses are displayed as colored areas. However, the way of displaying the ellipses is not limited to that. In other embodiments, as long as the ellipses are recognizable, it is possible to adopt other ways of displaying the ellipses such that the ellipses may be displayed in solid lines etc. In addition, any other information (e.g., any one of text, symbol, shape, color, and image or a combination of text, symbol, shape, color, and image) may be added to the image that displays the defined ellipse as the image for guiding location. Regarding this point, in FIGS. 13A to 13D, a string "hold red area above NFC tag" is added to the colored area whose shape is the defined ellipse.

Figure 4:
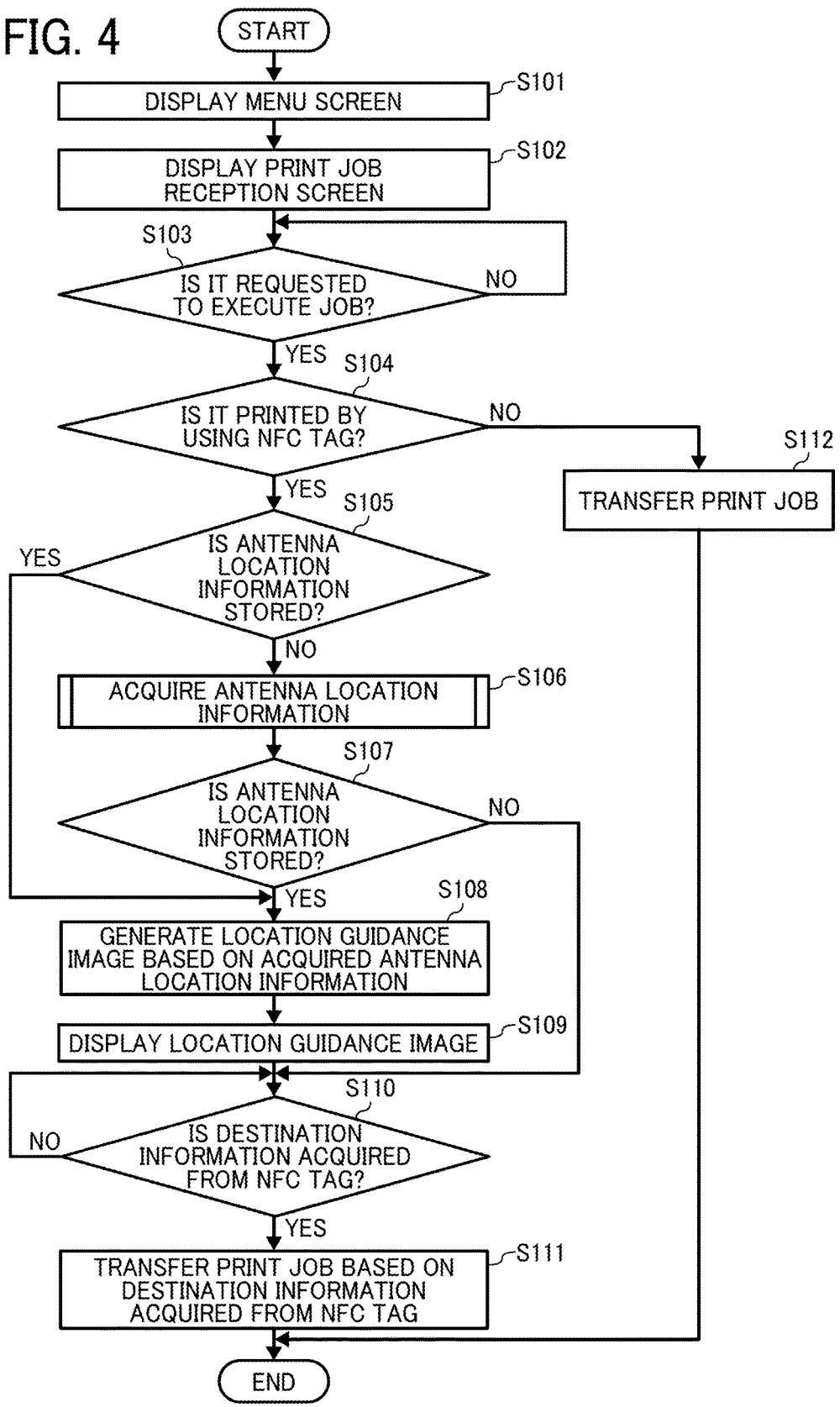
FIG. 4 is a flowchart illustrating an operation performed by an information processing apparatus as an embodiment of the present invention.

Now, the description continues with reference to FIG. 4.

In S109, the location guidance image display unit 125 displays the generated image for guiding location on the display 30. Subsequently, in S110, the print job generator 110 waits for destination information transferred by the NFC tag. On the other hand, in acquiring the antenna location information in S106, if the antenna location is not stored in the memory 127 (NO in S107), likewise, in S110, the destination information transferred by the NFC tag is waited.

Next, if the user holds the smartphone 10 above the NFC tag 60 attached on the printer 50, non-contact communication between the NFC antenna of the NFC tag 60 and the NFC antenna included in the smartphone 10 is established as the NFC antenna of the NFC tag 60 gets sufficiently close to the NFC antenna included in the smartphone 10. Subsequently, the print job generator 110 scans the IP address of the printer 50 stored in the NFC tag 60 via the established non-contact communication. As a result, if the IP address of the print 50 is acquired from the NFC tag 60 (YES in S110), the operation proceeds to S111. In S111, the print job generator 110 transfers the print job to the IP address acquired from the NFC tag 60, and the operation ends.

Figure 14:
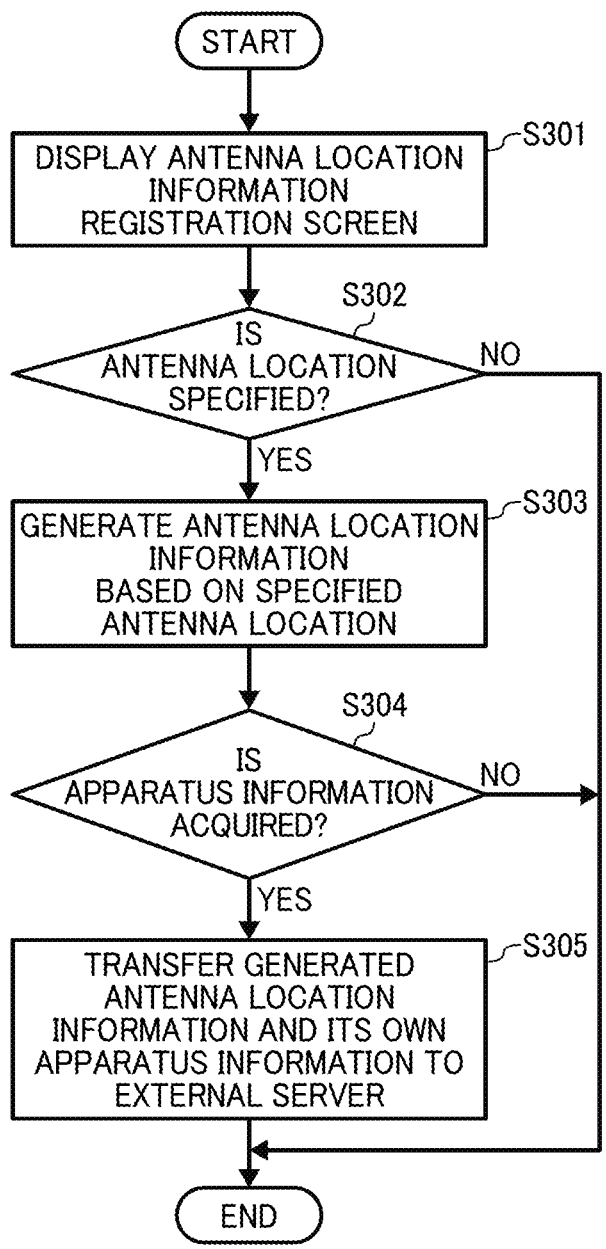
FIG. 14 is a flowchart illustrating an operation of generating information on defining antenna location as an embodiment of the present invention.

Here, if the antenna location information acquisition unit 124 could not acquire the antenna location information, an operation of generating the antenna location information by the antenna location information registration unit 128 is performed as described below with reference to the flow-chart illustrated in FIG. 14.

First, in S301, a screen for registering antenna location is displayed. As illustrated in FIG. 15A, on the screen for registering antenna location, a message "you can register NFC antenna location", a button "register now", and a button "cancel" are displayed. In response, if the button "cancel" is clicked by user operation, it is determined that antenna location is not selected by user operation (NO in S302), and the operation ends as is. In this case, the antenna location information is not stored in the memory 127.

By contrast, if the button "register now" is clicked by user operation, the screen transitions to a screen for selecting antenna location as illustrated in FIG. 15B. On the screen for selecting antenna location illustrated in FIG. 15B, along with a message "touch antenna location", grids dividing the display screen into partitions with a predetermined number of horizontal partitions and a predetermined number of vertical partitions are displayed on the display screen. In FIG. 15B, grids dividing the display screen into partitions including the horizontal number of partitions "4" and the vertical number of partitions "4" are displayed.

In response to display of the grids on the display screen, after specifying the antenna location by touching on a grid point corresponding to the antenna location that the user gets to know with reference to a user manual etc. of the smartphone 10, a combination of horizontal location of the horizontal line that passes a grid point P on the grids nearest to the point specified by the user, vertical location of the vertical line that passes the grid point P, the horizontal number of partitions preset as default, and the vertical number of partitions preset as default is stored in a temporary memory. Subsequently, the screen transitions to a screen for confirming antenna location as illustrated in FIG. 15C. Here, in FIG. 15B, after a combination of the horizontal line location "2", the vertical line location "3", the horizontal number of partitions "4", and the vertical number of partitions "4" is stored in the temporary memory, the screen transitions to the screen for confirming antenna location.

The screen for confirming antenna location illustrated in FIG. 15C displays an ellipse defined based on the information stored in the temporary memory (i.e., the horizontal line location, vertical line location, the horizontal number of partitions, and the vertical number of partitions) (i.e., the ellipse that passes four grid points adjacent to the grid point P nearest to the point on the grids specified by user operation), a button "OK", a button "select again", and a button for inputting modification of the horizontal number of partitions and the vertical number of partitions.

If the button "select again" displayed on the screen for confirming antenna location is clicked by user operation, the information stored in the temporary memory (i.e., the horizontal line location, vertical line location, the horizontal number of partitions, and the vertical number of partitions) is deleted, and the screen returns to the screen for selecting antenna location illustrated in FIG. 15B to wait for an input by user operation. By contrast, if the button "OK" displayed on the screen for confirming antenna location is clicked by user operation, it is determined that the antenna location is specified by user operation (YES in S302), and the operation proceeds to S303.

In S303, based on the information stored in the temporary memory (i.e., the horizontal line location, vertical line location, the horizontal number of partitions, and the vertical number of partitions), the antenna location information is generated.

On the other hand, if the button for accepting modifying the horizontal number of partitions or the vertical number of partitions displayed on the screen for confirming antenna location is clicked by user operation to command to modify at least any one of the horizontal number of partitions or the vertical number of partitions, among the information (i.e., the horizontal line location, vertical line location, the horizontal number of partitions, and the vertical number of partitions) stored in the temporary memory, the horizontal number of partitions and the vertical number of partitions are modified into the specified number of partitions. Then, grids and ellipse defined based on the modified information (i.e., the horizontal line location, vertical line location, the horizontal number of partitions, and the vertical number of partitions) are displayed on the display screen. In the screen for confirming antenna location illustrated in FIG. 15D, the horizontal number of partitions is changed from the default value "4" into "5" by user operation. In the screen for confirming antenna location illustrated in FIG. 15E, furthermore, the vertical number of partitions is changed from the default value "4" into "5" by user operation.

After clicking the button for modifying the horizontal number of partitions and the vertical number of partitions, if the button "OK" is clicked by user operation (YES in S302), the operation proceeds to S303, and the antenna location information is generated based on the modified information (i.e., the horizontal line location, vertical line location, the horizontal number of partitions, and the vertical number of partitions) stored in the temporary memory.

In S304, it is determined whether or not the apparatus information is acquired from the OS 130 in S202 in FIG. 6. If the apparatus information is not acquired (NO in S304), the operation ends as is. By contrast, if the apparatus information is acquired (YES in S304), the operation proceeds to S305. After transferring the antenna location information generated in S303 and its own apparatus information to the external server 70, the operation ends.

After receiving the antenna location information and the apparatus information from the smartphone 10, the external server 70 registers the received apparatus information and the antenna location information (i.e., the horizontal line location, vertical line location, the horizontal number of partitions, and the vertical number of partitions) in fields 201 to 205 in the antenna location management table 200 managed by the external server 70 itself. It should be noted that the registered antenna location information is provided to other users who use the same model.

The first embodiment of the present invention is described above. Next, a second embodiment of the present invention is described below. In the below description, description of points common to the first embodiment are omitted, and points different from the first embodiment are mainly described.

Second Embodiment

Figure 16A:
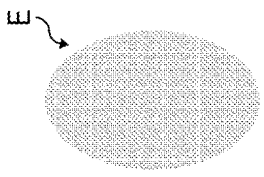
FIGS. 16A, 16B, 16C, and 16D are diagrams illustrating an operation generating the screen for introducing antenna location as an embodiment of the present invention.
Figure 16B:
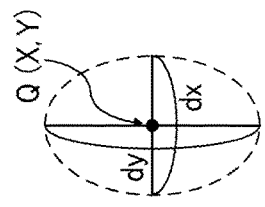
Figure 16C:
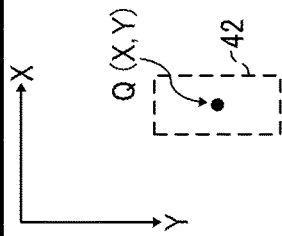

The second embodiment differs from the first embodiment in that a combination of (1) to (3) described below is considered as the antenna location information. (1) X-Y coordinates of a point Q on a display area corresponding to a location of the NFC antenna (2) length of a diameter of the ellipse in the X-axis direction of the display area (3) length of a diameter of the ellipse in the Y-axis direction of the display area For example, in case of a model Z illustrated in FIG. 16A, as illustrated in FIG. 16B, on the display area of the model Z, a point Q located just above the center of the NFC antenna 42 is defined as a point corresponding to the position of the NFC antenna 42. Subsequently, in this embodiment, as illustrated in FIG. 16C, a combination of three items of information, X-Y coordinates of the point Q (i.e., pixel coordinates), length of the diameter of the ellipse in the X-axis direction (dx), and length of the diameter of the ellipse in the Y-axis direction (dy) is defined as the antenna location information of the model Z. Here, it is assumed that the length of the diameter of the ellipse (dx) and the length of the diameter of the ellipse (dy) are appropriate corresponding to a shape and size of the NFC antenna 42.

FIG. 17 is a diagram illustrating an example of a antenna location management table 300 managed by the antenna location information manager 126 in this embodiment. As illustrated in FIG. 17, the antenna location management table 300 includes a field 301 that stores a model name as model information of an apparatus including the NFC antenna, a field 302 that stores a screen resolution (i.e., vertical number of pixels and horizontal number of pixels) of the display 30 located at the front of the apparatus including the NFC antenna, a field 303 that stores X-Y coordinates of the point Q corresponding to the location of the NFC antenna 42 (hereinafter referred to as NFC location coordinates), a field 304 that stores the length of the diameter of the ellipse (dx), and a field 305 that stores the length of the diameter of the ellipse (dy). In this embodiment, the antenna location information manager 126 manages the model name associated with the antenna location information (i.e., the NFC location coordinates, the length of the diameter of the ellipse (dx), and the length of the diameter of the ellipse (dy)) on the antenna location management table 300 for each model of portable information processing apparatuses.

Figure 16D:
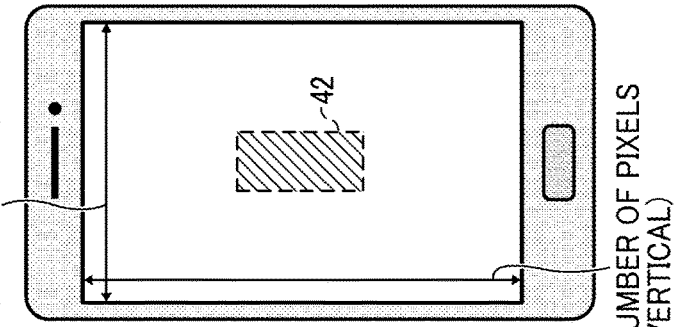

Next, based on the antenna location information described above, the location guidance image display unit 125 generates a location guidance image as described below. That is, as illustrated in FIG. 16C, after defining the ellipse whose center is the point Q indicated by the X-Y coordinates included in the antenna location information acquired by the memory 127 and whose length of diameters (dx and dy) are included in the antenna location information, the location guidance image display unit 125 generates an image illustrated in FIG. 16D as the location guidance image using the defined ellipse E.

Next, in this embodiment, the antenna location information registration unit 128 generates the antenna location information as described below.

First, a screen for registering antenna location illustrated in FIG. 18A is displayed. On the screen, if the button "register now" is clicked by user operation, the screen transitions to a screen for selecting antenna location as illustrated in FIG. 18B. In FIG. 18B, along with the message "touch antenna location", a blank screen is displayed.

In response to display of the blank screen, after specifying the antenna location by touching on the point Q on the display area corresponding to the antenna location that the user gets to know with reference to a user manual etc. of the smartphone 10, the antenna location information registration unit 128 stores a combination of the X-Y coordinates of the point Q (i.e., pixel coordinates) and (dx) and (dy) preset as default in the temporary memory, and the screen transitions to a screen for confirming antenna location as illustrated in FIG. 18C.

On the screen for confirming antenna location illustrated in FIG. 18C, the ellipse defined based on the information (i.e., the X-Y coordinates of the point Q, (dx), and (dy)) stored in the temporary memory (that is, the ellipse whose center is the point Q and whose lengths of diameters in the X-axis direction and the Y-axis direction are (dx) and (dy)) is displayed as illustrated in FIG. 18C. A button "OK", a button "select again", and a button for accepting modifying lengths of diameters of the ellipse (i.e., (dx) and (dy)) are displayed as well.

If the button "select again" displayed on the screen for confirming antenna location is clicked by user operation, the information stored in the temporary memory (i.e., the X-Y coordinates of the point Q, (dx), and (dy)) is deleted, and the screen returns to the screen for selecting antenna location illustrated in FIG. 18B to wait for an input by user operation. By contrast, after the button "OK" displayed on the screen for confirming antenna location is clicked by user operation, antenna location information is generated based on the information stored in the temporary memory (i.e., the X-Y coordinates of the point Q, (dx), and (dy)).

On the other hand, if the button for accepting modifying lengths of diameters of the ellipse (i.e., (dx) and (dy)) displayed on the screen for confirming antenna location is clicked by user operation to command to modify at least any one of the diameters (dx) and (dy), among the information (i.e., the X-Y coordinates of the point Q, (dx), and (dy)) stored in the temporary memory, the length of diameters of the ellipse (dx) and (dy) are modified into the specified length, and ellipse defined based on the modified information (i.e., the X-Y coordinates of the point Q, (dx), and (dy)) is displayed on the display screen. In FIG. 18D, a screen for confirming antenna location displayed if the length of (dy) is increased from the default value by user operation is illustrated. In FIG. 18E, a screen for confirming antenna location displayed if the length of (dx) is further increased from the default value by user operation is illustrated.

Next, if the button "OK" is clicked by user operation, antenna location information is generated based on the information stored in the temporary memory (i.e., the X-Y coordinates of the point Q, (dx), and (dy)).

As described above, in this embodiment, the user may intuitively recognize the location of the NFC antenna 42 from the position of the ellipse included in the location guidance image displayed on the display 30 and quickly bring the NFC antenna 42 closer to the NFC tag 60. As a result, it is possible to establish non-contact communication easily.

In the embodiment described above, the operation of acquiring information on defining antenna location is described based on the case that the antenna location management table 200 is managed by the antenna location information manager 126 and the external server 70. However, it is possible that the antenna location management table 200 is managed by either the antenna location information manager 126 or the external server 70.

Third Embodiment

In this embodiment, in FIG. 3, the antenna location information acquisition unit 124 is replaced by the antenna location guidance image acquisition unit 124, and the antenna location information registration unit 128 is replaced with the antenna location guidance image registration unit 128. In addition, the antenna location information manager 126 is omitted. Here, the antenna location guidance image registration unit 128 accepts registering the antenna location guidance image by user operation if its own model information or the antenna location information corresponding to its own model information could not be acquired. In addition, in the server apparatus 70 in this embodiment, the antenna location information manager 72 is replaced with the antenna location guidance image manager 72, and the antenna location information provider 74 is replaced with the antenna location guidance image provider 74. The antenna location guidance image manager 72 manages model information of mobile information processing apparatuses that includes the NFC function (e.g., tablet PCs and smartphones etc.) and the corresponding antenna location guidance image associated with each other. The antenna location guidance image provider 74 provides antenna location guidance image managed by the antenna location guidance image manager 72 in response to a request from mobile information processing apparatus provided with the NFC function (e.g., tablet PCs and smartphones etc.).

Figure 19:
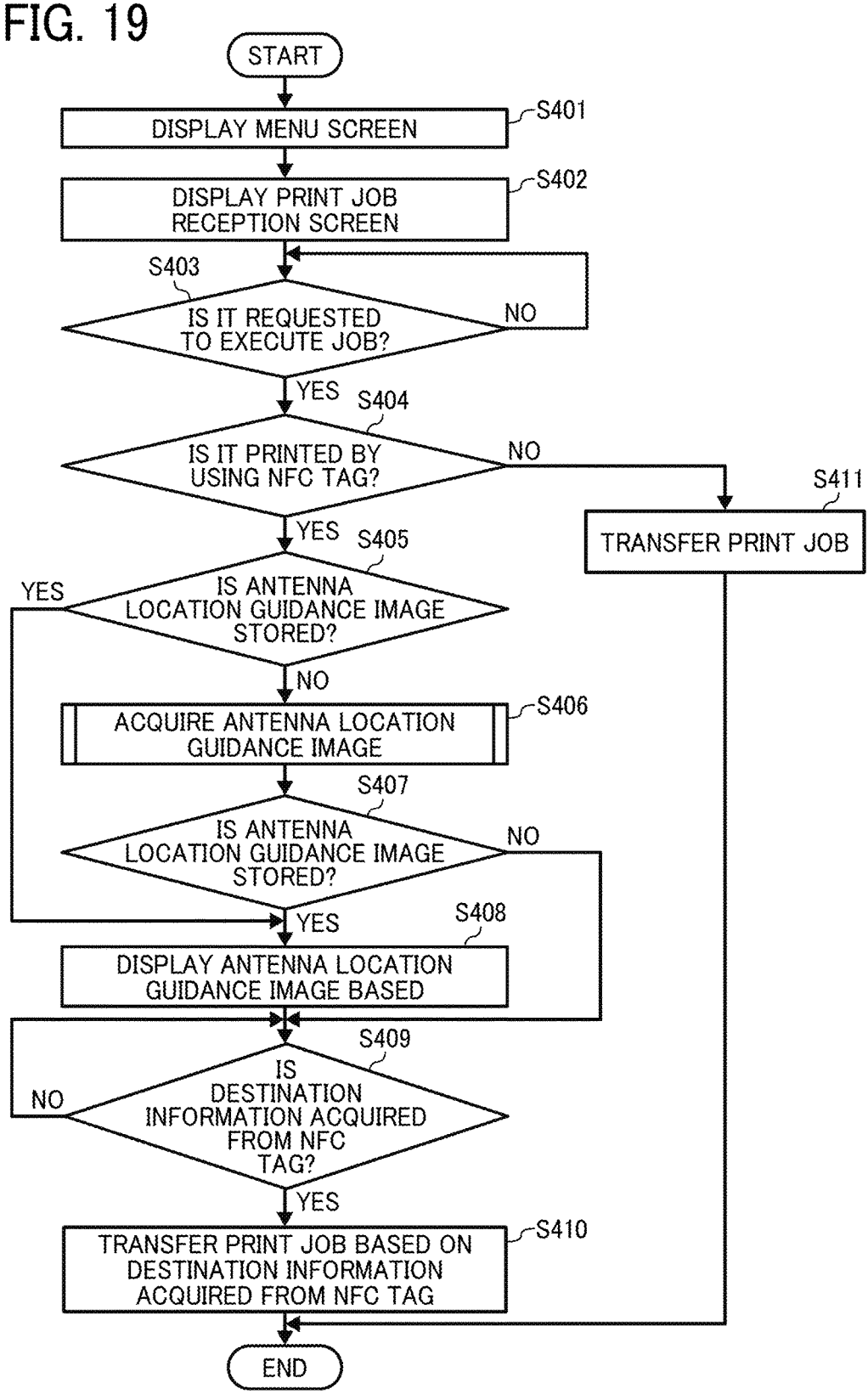
FIG. 19 is a flowchart illustrating an operation performed by the information processing apparatus as an embodiment of the present invention.

Next, an operation performed by the smartphone 10 is described below with reference to the flowchart illustrated in FIG. 19.

After the print application is started by user operation, the print job generator 110 performs steps S401 to S404. First, in S401, a menu screen of the print application illustrated in FIG. 5A is displayed on the display 30. For example, after "print photo" among lists displayed in the menu screen is selected by user operation, a screen for selecting a photo illustrated in FIG. 5B is displayed. After a thumbnail of a photo to be printed is selected by user operation, in S402, a screen for accepting a print job is displayed.

An example of the screen for accepting a print job displayed in S402 is illustrated in FIG. 5C. As illustrated in FIG. 5C, in the screen for accepting a print job, "print settings" button for configuring conditions of the print job is displayed along with a preview of the photo selected by user operation. Furthermore, on the screen for accepting a print job, two buttons, "print using configured printer" and "print using NFC tag", for accepting a command to execute the print job by user operation are displayed.

After displaying the screen for accepting a print job, the print job generator 110 waits for a command to execute the job by user operation in S403. After the screen for accepting a print job is displayed, if either one of the two buttons described above is selected by user operation (YES in S403), it is determined whether or not "print using NFC tag" is selected in S404 subsequently. As a result, if "print using NFC tag" is not selected (i.e., "print using configured printer" is selected) (NO in S404), the operation proceeds to S412. In S412, an IP address as destination information of the configured printer as a print destination is read from a predetermined memory managed by the print application, and the print job is transferred to the read IP address to end the operation.

By contrast, if "print using NFC tag" is selected (YES in S404), the antenna location guidance unit 120 is called by the print job generator 110, and steps S405 to S408 are performed.

First, in S405, the location guidance image display unit 125 determines whether or not its own antenna location guidance image is stored in the memory 127. As a result, if it is determined that its own antenna location guidance image is not stored in the memory 127 (NO in S405), the operation proceeds to S406, and the antenna location guidance image acquisition unit 124 acquires antenna location guidance image.

Here, an operation of acquiring an image of guiding antenna location performed by the antenna location guidance image acquisition unit 124 is described below with reference to a sequence chart illustrated in FIG. 20.

First, the antenna location guidance image acquisition unit 124 requests the OS 130 to acquire the model information to acquire its own model name as its own model information in S11. Next, the antenna location guidance image acquisition unit 124 generates a request for acquiring antenna location guidance image including the model name (i.e., model information) acquired in S11 and transfers the request to the server apparatus 70 via the network 90. In response to the request, the antenna location guidance image provider 74 in the server apparatus 70 searches through the antenna location guidance image management table 400 in S13.

FIG. 21 is a diagram illustrating an example of the antenna location guidance image management table 400 managed by the antenna location guidance image manager 72 in this embodiment. As illustrated in FIG. 21, the antenna location guidance image management table 400 includes a field 401 that stores a model name as model information of each mobile information processing apparatus and a field 402 that stores an antenna location guidance image (i.e., its storing path) for guiding antenna location of the information processing apparatus, and manages the model name and the antenna location guidance image associated with each other.

Here, the antenna location guidance image indicates an image that enables the user to identify the location of the NFC antenna, which may vary in text, symbol, shape, color.

Figure 22A:
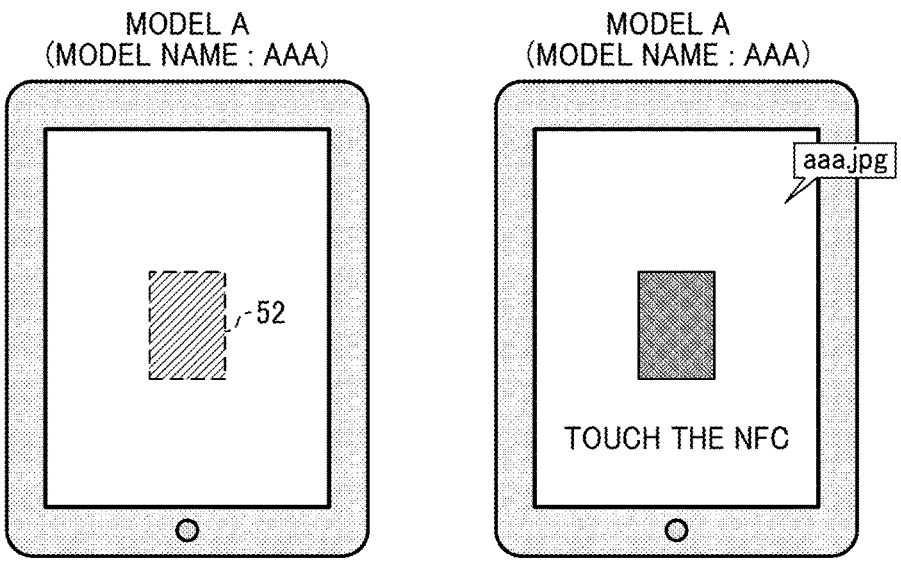
FIGS. 22A, 22B, and 22C are diagrams illustrating the image for introducing antenna location as an embodiment of the present invention.
Figure 22B:
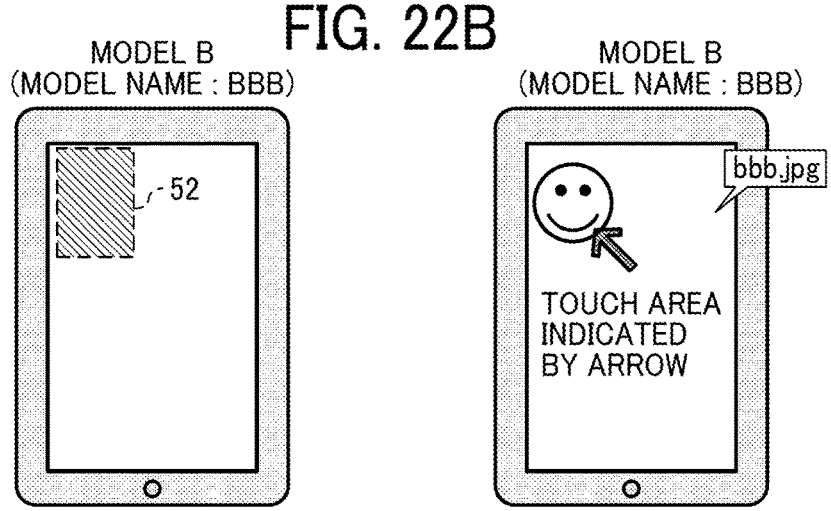
Figure 22C:
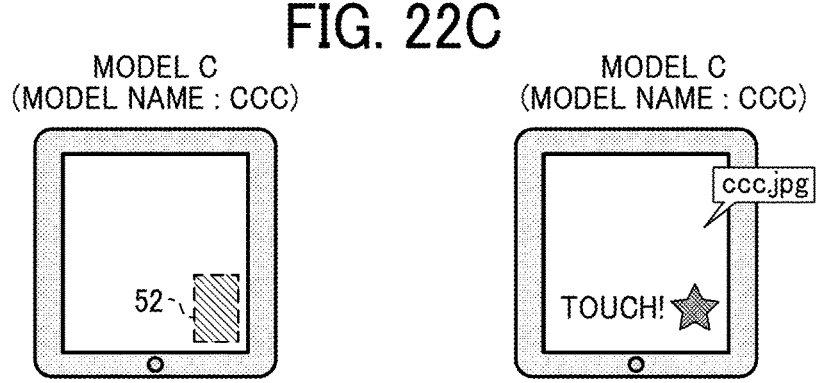

Here, FIGS. 22A to 22C are diagrams each illustrating a location of the NFC antenna 42 for each model and antenna location guidance images associated with the model as examples. Here, in the antenna location guidance images illustrated in FIGS. 22A to 22C, a figure (geographical image) that show a user the location of the NFC antenna 42 is displayed at a position on the display screen corresponding to the position of the NFC antenna 42 (i.e., a position located just above the NFC antenna 42).

More specifically, as illustrated in FIG. 22A, the antenna location guidance image (aaa.jpg) corresponding to the model A is constructed as an image that displays a rectangular colored area at an area located just above the NFC antenna 42a on the display screen. As illustrated in FIG. 22B, the antenna location guidance image (bbb.jpg) corresponding to the model B is constructed as an image that displays an image of a smile face at an area located just above the NFC antenna 42b on the display screen. As illustrated in FIG. 22C, the antenna location guidance image (ccc.jpg) corresponding to the model C is constructed as an image that displays a star shape at an area located just above the NFC antenna 42c on the display screen.

As illustrated in FIG. 22, by adopting an image displaying a graphical image just above a point where the NFC antenna 42 is located as the antenna location guidance image, the user may intuitively know the location of the NFC antenna 42.

Figure 20:
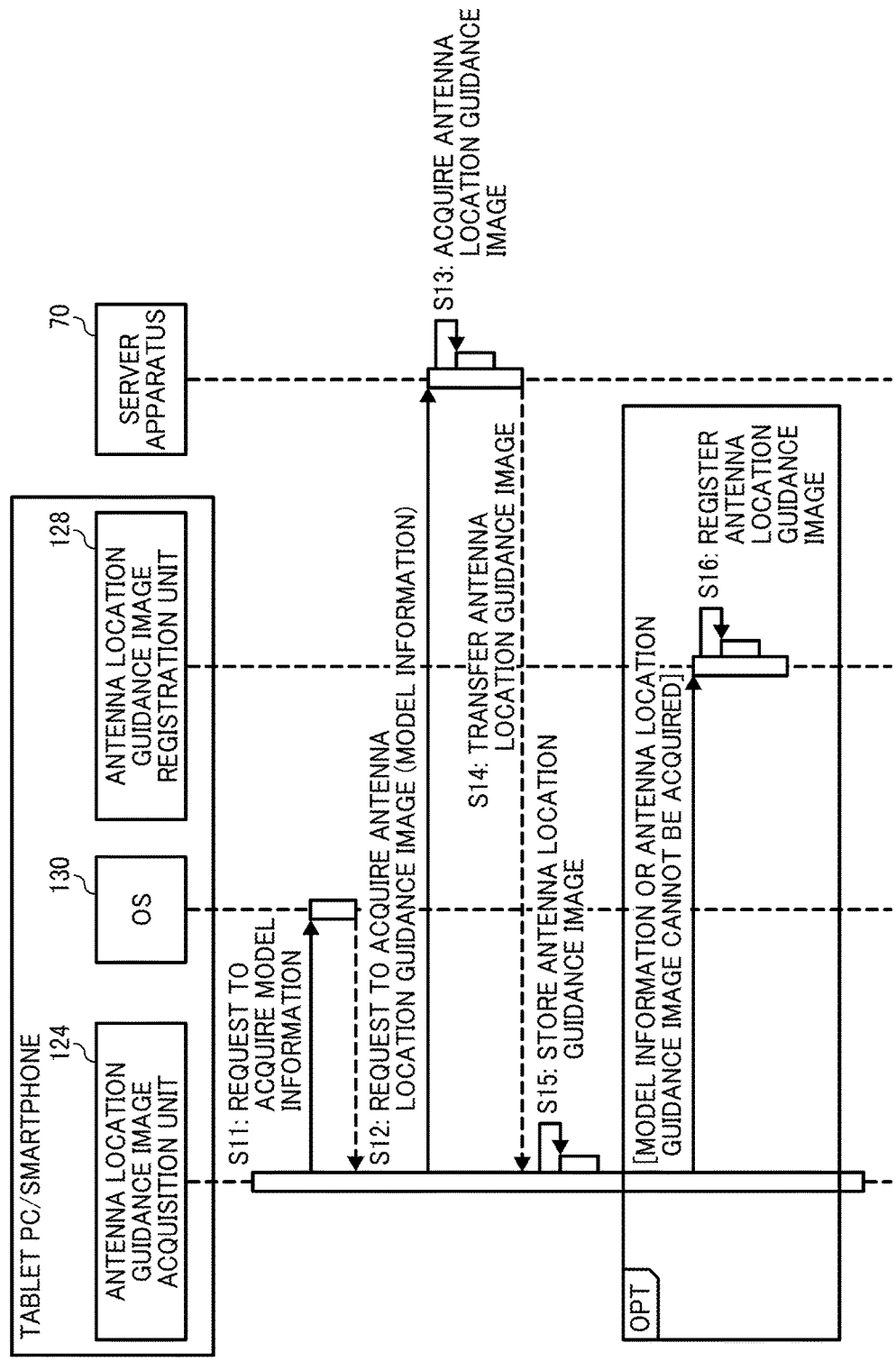
FIG. 20 is a diagram illustrating an operation of acquiring an image for introducing an antenna location as an embodiment of the present invention.

Now, the description continues with reference to FIG. 20.

Next, the antenna location guidance image provider 74 searches through the antenna location guidance image management table 400 using the model name included in the request for acquiring antenna location guidance image received from the smartphone 10 as a key, acquires the corresponding antenna location guidance image associated with the key in S13, and transfers the acquired antenna location guidance image to the smartphone 10 in S14.

The antenna location guidance image acquisition unit 124 stores the acquired antenna location guidance image acquired from the server apparatus 70 in the memory 127 in S15, and the operation ends.

By contrast, due to some reasons, if the model information is not acquired from the OS 130 (NO in S202) or the antenna location guidance image is not acquired from the server apparatus 70, the antenna location guidance image acquisition unit 124 calls the antenna location guidance image registration unit 128, and the antenna location guidance image registration unit 128 registers the antenna location guidance image in S16.

Figure 23:
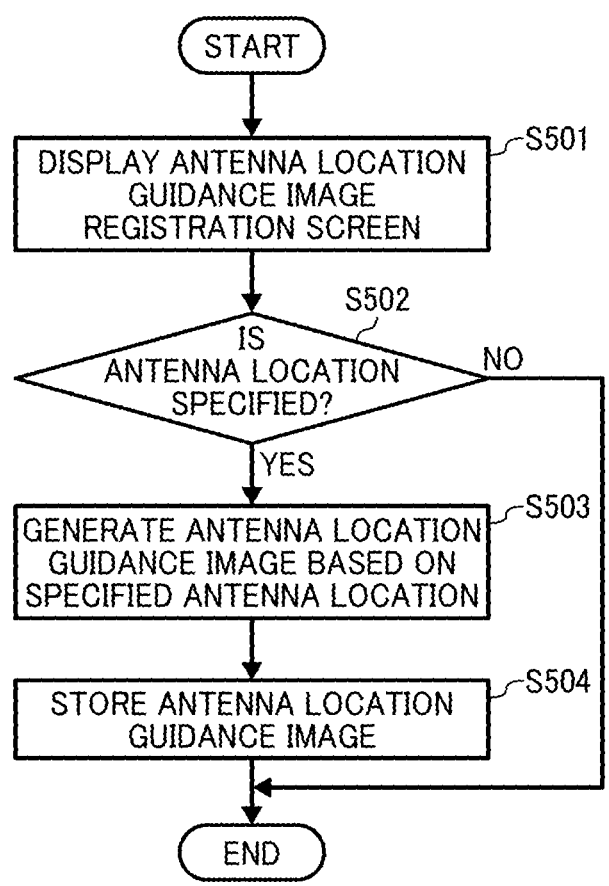
FIG. 23 is a flowchart illustrating an operation of registering the image for introducing antenna location as an embodiment of the present invention.

Here, the operation of registering antenna location guidance image performed by the antenna location guidance image registration unit 128 is described below with reference to a flowchart illustrated in FIG. 23.

First, in S501, a screen for registering an image guiding antenna location as illustrated in FIG. 24A is displayed. As illustrated in FIG. 24 (A), on the screen for registering an image guiding antenna location, a message "you can register antenna location guidance image", a button "register now", and a button "cancel" are displayed. In response, if the button "cancel" is clicked by user operation, it is determined that antenna location is not specified by user operation (NO in S502), and the operation ends. In this case, the antenna location guidance image is not stored in the memory 127.

By contrast, if the button "register now" is clicked by user operation, the screen transitions to a screen for selecting antenna location to wait for input by user operation. On the screen for selecting antenna location illustrated in FIG. 24 (B), along with a message "touch antenna location", the grids dividing the display area into partitions with the predetermined number of horizontal partitions and the predetermined number of vertical partitions are displayed on the display screen. In FIG. 24 (B), 20 grids dividing the display screen into partitions with the horizontal number of partitions "4" and the vertical number of partitions "5" are displayed as an example.

Next, after specifying the antenna location by touching on a partition corresponding to the antenna location that the user gets to know with reference to a user manual etc. of the smartphone 10, a screen for confirming antenna location is displayed. As illustrated in FIG. 24 (C), in the screen for confirming antenna location, the partition touched by user operation is displayed with emphasis, and a message "do you register this location?" is also displayed.

If the button "OK" displayed on the screen for confirming antenna location is clicked by user operation, it is determined that the antenna location is specified by user operation (YES in S502), and the operation proceeds to S503. In S503, as the antenna location guidance image, an image that displays the partition specified by user operation is generated. In FIG. 24 (D), the antenna location guidance image generated in S503 is illustrated. Lastly, in S504, the generated antenna location guidance image is stored in the memory 127, and the operation of registering an image for guiding antenna location.

The operation of acquiring antenna location guidance image including the operation of registering antenna location guidance image is described above. Now, the description continues with reference to FIG. 19.

If the antenna location guidance image is stored in the memory 127 after acquiring antenna location guidance image in S406 (YES in S407) or it is determined that its own antenna location guidance image is stored in the memory 127 in S405 (YES in S405), the operation proceeds to S408. After reading the antenna location guidance image stored in the memory 127, the antenna location guidance image is displayed on the display 30.

Subsequently, in S409, the print job generator 110 waits for destination information transferred by the NFC tag. By contrast, if the antenna location guidance image is not acquired in the operation of acquiring antenna location guidance image (NO in S407), similarly, in S409, destination information transferred by the NFC tag is waited.

Next, if the user holds the tablet PC 10 above the NFC tag 60 attached on the printer 50, non-contact communication between the NFC antenna of the NFC tag 60 and the NFC antenna included in the tablet PC 10 is established as the NFC antenna of the NFC tag 60 gets sufficiently close to the NFC antenna included in the tablet PC 10. Subsequently, the print job generator 110 scans the IP address of the printer 50 stored in the NFC tag 60 via the established non-contact communication. As a result, if the IP address of the print 50 is acquired from the NFC tag 60 (YES in S409), the operation proceeds to S410. In S410, the print job generator 110 transfers the print job to the IP address acquired from the NFC tag 60, and the operation ends.

As described above, in this embodiment, the user may intuitively recognize the location of the NFC antenna 42 included in the smartphone 10 based on the antenna location guidance image displayed on the display 30 and quickly bring the NFC antenna 42 close to the NFC tag 60. As a result, it is possible to establish non-contact communication easily.

In the embodiments described above, the antenna location guidance unit 120 is used as a module of the print application. However, the antenna location guidance unit 120 may be included in any application. For example, the antenna location guidance unit 120 may be included in an application that transfers data to projectors. In addition, in the embodiments described above, the antenna location guidance unit 120 is used as a module called from a main program such as the print application. However, it is possible to build the antenna location guidance unit 120 itself as an independent application program (e.g., an application that users can check a location of the NFC antenna).

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination. The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

Numerous additional modifications and variations are possible in light of the above teachings. It is therefore to be understood that within the scope of the appended claims, the disclosure of the present invention may be practiced otherwise than as specifically described herein.

For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A method of processing information performed by an information processing apparatus provided with a non-contact antenna, the method comprising:
receiving, from a user carrying and operating the information processing apparatus, an instruction;
establishing, based on the received instruction, a non-contact communication with a counterpart communication apparatus via the non-contact antenna; and
displaying, on a display of the information processing apparatus, a location guide image indicating a location of the non-contact antenna in the information processing apparatus in response to the receiving, the location guide image including an ellipse placed at a portion of a display screen of the display corresponding to the location of the non-contact antenna.

2. The method of processing information according to claim 1, the method further comprising:
storing, for each model of a plurality of information processing apparatuses with a non-contact communication function, model information indicating the model of the information processing apparatus associated with antenna location information indicating the location of the non-contact antenna;
acquiring the model information of the information processing apparatus from an operating system of the information processing apparatus;
acquiring antenna location information associated with the acquired model information of the information processing apparatus;
defining on the display screen a center point of the non-contact antenna based on the acquired antenna location information; and
displaying the location guide image including the ellipse having a center placed at the defined center point on the display screen.

3. The method of processing information according to claim 2,
wherein the antenna location information is a combination of information items that are obtained through dividing, with a plurality of grids, a display area of the display screen of the information processing apparatus into a predetermined number of partitions,
wherein the information items include:
(1) a horizontal partition number indicating a number of partitions of the grids in a horizontal direction;
(2) a vertical partition number indicating a number of partitions of the grids in a vertical direction;
(3) a horizontal line location indicating a location of a horizontal line that passes through a grid point corresponding to the location of the non-contact antenna, and
(4) a vertical line location indicating a location of a vertical line that passes through the grid point corresponding to the location of the non-contact antenna, and
the method further comprising:
defining the grids that divide the display area of the display screen of the information processing apparatus into the predetermined number of partitions based on the horizontal partition number and the vertical partition number included in the antenna location information;
defining a grid point where the horizontal line indicated by the horizontal line location and the vertical line indicated by the vertical line location intersect, as the center point of the non-contact antenna; and
displaying the location guide image including the ellipse having an outline passing through at least four grids, the four grids being adjacent to the grid point defined as the center point of the non-contact antenna.

4. The method of processing information according to claim 3, wherein, when a part of the ellipse whose center is the defined center point is out of the display area, the method further comprising:
displaying the location guide image including a part of the ellipse from which the part that is out of the display area is missing, on the display screen.

5. The method of processing information according to claim 3, the method further comprising:
determining whether the model information or the antenna location information is not acquired; and
based on a determination indicating that the model information or the antenna location information is not acquired, requesting the user to register the antenna location information of the information processing apparatus.

6. The method of processing information according to claim 5, the method further comprising:
displaying the grids dividing the display area of the display screen into the predetermined number of partitions defined with the horizontal partition number and the vertical partition number;
specifying a location on the grids displayed on the display screen by user operation to input as user specified information; and
modifying the antenna location information with user specified information, the user specified information being a combination of information items including:
a specified horizontal line location indicating a location of a horizontal line that goes through a nearest grid point nearest to a location specified by user operation; and
a specified vertical line location indicating a location of a vertical line that goes through the nearest grid point.

7. The method of processing information according to claim 6, the method further comprising:
accepting a request for modifying the horizontal partition number or the vertical partition number by user operation; and
modifying the antenna location information with the user specified information, the user specified information further including:
a specified horizontal partition number indicating a number of partitions of the grids in a horizontal direction, specified by use operation; and
a specified vertical partition number indicating a number of partitions of the grids in a horizontal direction, specified by use operation.

8. The method of processing information according to claim 2,
wherein the antenna location information is a combination of information items including X-Y coordinates of a point corresponding to the location of the non-contact antenna in a display area of the display screen, a first length of a diameter of the ellipse in a X-axis direction, and a second length of a diameter of the ellipse in a Y-axis direction, and the method further comprising displaying the location guide image including the ellipse having a center placed at the point.

9. The method of processing information according to claim 8, the method further comprising:
displaying the location guide image including a part of the ellipse, whose center is the center point indicated by the X-Y coordinates, from which the part that is out of the display area is missing, on the display screen.

10. The method of processing information according to claim 8, the method further comprising:
based on a determination indicating that the model information or the antenna location information is not acquired, requesting the user to register the antenna location information of the information processing apparatus.

11. The method of processing information according to claim 10, the method further comprising:
specifying a location in the display area of the display screen by user operation as user specified information; and
modifying the antenna location information with user specified information, the user specified information being a combination of information items including X-Y coordinates of a location specified by user operation in the display area of the display screen.

12. The method of processing information according to claim 11, the method further comprising:
accepting a request for modifying the first length or the second length by user operation; and
modifying the antenna location information with the user specified information, the user specified information further including a modified first length and a modified second length.

13. The method of processing information according to claim 1, the method further comprising:
acquiring model information of the information processing apparatus from an operating system of the information processing apparatus;
acquiring antenna location information associated with the acquired model information of the information processing apparatus from a server apparatus, the server apparatus storing the model information indicating a model of the information processing apparatus associated with the antenna location information indicating the location of the non-contact antenna for non-contact communication;
defining on the display screen a center point of the non-contact antenna based on the acquired antenna location information; and
displaying the location guide image including the ellipse having a center placed at the defined center point on the display screen.

14. A non-transitory, computer-readable recording medium storing a program that, when executed by one or more processors of an information processing apparatus, causes the processors to implement a method of processing information, comprising:
displaying, on a display of the information processing apparatus, a location guide image indicating a location of a non-contact antenna in the information processing apparatus, the location guide image including an ellipse placed at a portion of a display screen of the display corresponding to the location of the non-contact antenna.

15. An information processing apparatus comprising:
a non-contact antenna to communicate with a communication counterpart via a non-contact communication;
a display screen; and
circuitry to generate a location guide image indicating a location of the non-contact antenna in the information processing apparatus, the location guide image including an ellipse placed at a portion of the display screen corresponding to the location of the non-contact antenna.

16. The information processing apparatus according to claim 15, further comprising:
a memory to store, for each model of a plurality of information processing apparatuses with a non-contact communication function, model information indicating the model of the information processing apparatus associated with antenna location information indicating the location of the non-contact antenna; and
circuitry to:
acquire the model information of the information processing apparatus from an operating system of the information processing apparatus;
acquire antenna location information associated with the acquired model information of the information processing apparatus;
define on the display screen a center point of the non-contact antenna based on the acquired antenna location information; and
display the location guide image including the ellipse having a center placed at the defined center point on the display screen.

17. The information processing apparatus according to claim 15, further comprising:
a network interface to acquire from, a server apparatus, antenna location information associated with model information of the information processing apparatus that is acquired from an operating system of the information processing apparatus, the server apparatus storing the model information indicating a model of the information processing apparatus associated with the antenna location information indicating the location of the non-contact antenna for non-contact communication,
wherein the circuitry further:
defines on the display screen a center point of the non-contact antenna based on the acquired antenna location information; and
displays the location guide image including the ellipse having a center placed at the defined center point on the display screen.

18. The information processing apparatus according to claim 17,
wherein the circuitry further:
requests, based on a determination indicating that the model information or the antenna location information is not acquired, a user to register the antenna location information of the information processing apparatus;
displays grids dividing a display area of the display screen into partitions defined with a horizontal partition number and a vertical partition number;
specifies a location on the grids displayed on the display screen by user operation to input as user specified information;
modifies the antenna location information with user specified information, the user specified information being a combination of information items including:

a specified horizontal line location indicating a location of a horizontal line that goes through a nearest grid point nearest to a location specified by user operation; and
a specified vertical line location indicating a location of a vertical line that goes through the nearest grid point; and transfers the modified antenna location information and the model information of the information processing apparatus to the server apparatus.

\* \* \* \* \*